United States Patent
Salem et al.

(10) Patent No.: US 11,102,786 B2
(45) Date of Patent: Aug. 24, 2021

(54) METHODS AND APPARATUS FOR ENHANCED SPECTRAL EFFICIENCY AND RELIABILITY OF TRANSMISSION WITHOUT GRANT

(71) Applicant: Huawei Technologies Co., Ltd., Shenzhen (CN)

(72) Inventors: Mohamed Adel Salem, Kanata (CA); Toufiqul Islam, Ottawa (CA); Sanjeewa Herath, Ottawa (CA); Alireza Bayesteh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/910,238

(22) Filed: Mar. 2, 2018

(65) Prior Publication Data

US 2018/0279315 A1 Sep. 27, 2018

Related U.S. Application Data

(60) Provisional application No. 62/477,062, filed on Mar. 27, 2017.

(51) Int. Cl.
*H04W 72/04* (2009.01)
*H04W 72/08* (2009.01)
(Continued)

(52) U.S. Cl.
CPC .......... *H04W 72/08* (2013.01); *H04L 1/00* (2013.01); *H04L 1/0025* (2013.01); *H04L 1/0072* (2013.01); *H04L 1/08* (2013.01); *H04L 1/1671* (2013.01); *H04L 1/203* (2013.01); *H04W 72/042* (2013.01)

(58) Field of Classification Search
None
See application file for complete search history.

(56) References Cited

U.S. PATENT DOCUMENTS

| 2014/0254544 A1* | 9/2014 | Kar Kin Au .......... H04L 5/0033 370/330 |
| 2016/0037503 A1 | 2/2016 | Wu |

(Continued)

FOREIGN PATENT DOCUMENTS

| CN | 101296480 A | 10/2008 |
| CN | 101340622 A | 1/2009 |

(Continued)

OTHER PUBLICATIONS

R1-1701962 Guangdong OPPO Mobile Telecom,"Discussions on uplink grant-free transmission",3GPP TSG RAN WG1 Meeting #88,Athens, Greece, Feb. 13-17, 2017,total 5 pages.

(Continued)

*Primary Examiner* — Kent Krueger
(74) *Attorney, Agent, or Firm* — Slater Matsil, LLP

(57) ABSTRACT

Methods and devices for enhancing the spectral efficiency and/or reliability of uplink transmission without grant are provided. Uplink transmissions without grant are transmitted by UEs or received by base stations in accordance with resource groups that map initial uplink transmissions without grant and non-zero numbers of re-transmissions without grant to sub-regions of a grant-free region of a time-frequency resource.

32 Claims, 20 Drawing Sheets

(51) Int. Cl.
*H04L 1/08* (2006.01)
*H04L 1/00* (2006.01)
*H04L 1/16* (2006.01)
*H04L 1/20* (2006.01)

(56) References Cited

U.S. PATENT DOCUMENTS

| | | | |
|---|---|---|---|
| 2016/0249333 A1* | 8/2016 | Freda | H04W 72/0406 |
| 2016/0352454 A1 | 12/2016 | Zhang et al. | |
| 2017/0288817 A1 | 10/2017 | Cao et al. | |
| 2018/0035331 A1* | 2/2018 | Sundman | H04L 1/00 |
| 2018/0092125 A1* | 3/2018 | Sun | H04W 74/02 |
| 2018/0124816 A1 | 5/2018 | Han et al. | |

FOREIGN PATENT DOCUMENTS

| | | |
|---|---|---|
| CN | 105323859 A | 2/2016 |
| JP | 2016514416 A | 5/2016 |
| WO | 2016140602 A1 | 9/2016 |
| WO | 2016206650 A1 | 12/2016 |

OTHER PUBLICATIONS

Zte et al, "Basic Grant-free Transmission for URLLC", 3GPP TSG RAN WG1 AH NR Meeting, R1-1700253, Jan. 16-20, 2017, 5 pages, Spokane, USA.

* cited by examiner

METHODS AND APPARATUS FOR ENHANCED SPECTRAL EFFICIENCY AND RELIABILITY OF TRANSMISSION WITHOUT GRANT

CROSS-REFERENCE TO RELATED APPLICATION

This application claims the benefit of U.S. Provisional Patent Application No. 62/477,062 entitled "Methods for Enhanced Spectral Efficiency and Reliability of Grant-free Transmissions" filed Mar. 27, 2017, the entire content of which is incorporated herein by reference.

FIELD

The application relates generally to wireless communications, and in particular embodiments, to methods and systems for uplink transmissions without grant.

BACKGROUND

In some wireless communication systems, a user equipment (UE) wirelessly communicates with a Transmission and Receive Point (TRP), for example a base station to send data to the UE and/or receive data from the UE. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame, this transmission mode is called grant based transmission.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free or without grant uplink transmission scheme in which UEs may send uplink transmissions using certain uplink resources shared by the UEs, without specifically requesting use of the resources and without specifically being granted the resources by the base station. The base station will therefore not know which UE, if any, is going to send an uplink transmission without grant using the resources.

In some grant-free or without grant schemes, the UE is preconfigured with one or more patterns of transmission resources to be used for uplink transmissions. A base station will therefore not know which UE, if any, is going to send a new uplink transmission without grant at a given time slot. However, once the base station detects a new transmission without grant on a resource, the base station can determine the preconfigured pattern in use by the UE, and thus can determine the resources that will be used for subsequent retransmission(s) in advance according to the preconfigured pattern in use.

In some cases, when a particular UE sends an uplink transmission without grant, the base station may not be able to decode the data in the uplink transmission.

SUMMARY

A first aspect of the present disclosure provides a method for a base station in a wireless network. The method according to the first aspect of the present disclosure includes a base station receiving an uplink transmission without grant from a UE in accordance with a resource group that maps an initial uplink transmission without grant and a non-zero number of re-transmissions without grant to sub-regions of a grant-free region of a time-frequency resource.

In some embodiments of the method of the first aspect of the present disclosure the resource group is pre-configured such that a modulation and coding scheme (MCS) level for each re-transmission without grant is a same or lower than a MCS level for a corresponding preceding uplink transmission without grant or re-transmission without grant by the UE.

In some embodiments of the method of the first aspect of the present disclosure the method further includes sending, by the base station, a resource configuration message to the UE to configure sub-regions and numerology for the initial uplink transmission without grant, and sub-regions and numerology for each re-transmission without grant.

In some embodiments of the method of the first aspect of the present disclosure the resource configuration message comprises an indication of the number of retransmissions.

In some embodiments of the method of the first aspect of the present disclosure the resource group is configured based upon target signal quality or reliability level of the received grant free transmission.

In some embodiments of the method of the first aspect of the present disclosure the method further includes transmitting, through a higher layer signaling, a configuration message to instruct the UE to use the pre-configured resource group for uplink transmission without grant.

In some embodiments of the method of the first aspect of the present disclosure each one of the sub-regions is associated with a different numerology.

In some embodiments of the method of the first aspect of the present disclosure the resource group maps the initial uplink transmission without grant and the non-zero number of successive re-transmissions without grant to sub-regions of the grant-free region of the time-frequency resource such that the re-transmissions without grant occupy a gradually increasing amount of time resources, frequency resources, or both.

In some embodiments of the method of the first aspect of the present disclosure the resource group is among a plurality of pre-configured resource groups, each pre-configured resource group in the plurality being associated with a group index, and the base station instructs the UE to change to another pre-configured resource group by transmitting a message to the UE indicating the group index associated with the other pre-configured resource group.

In some embodiments of the method of the first aspect of the present disclosure the message indicating the group index associated with the other pre-configured resource group is transmitted through higher layer Radio Resource Control (RRC) signaling.

In some embodiments of the method of the first aspect of the present disclosure the message indicating the group index associated with the other pre-configured resource group is transmitted within a UE-specific downlink control information (DCI) message or on a group common DCI.

In some embodiments of the method of the first aspect of the present disclosure the method further includes, in response to successfully decoding a transport block received from the UE, the base station transmitting an acknowledgement or DCI signaling to the UE.

A second aspect of the present disclosure provides a method for a user equipment (UE) in a wireless network. The method according to the second aspect of the present disclosure includes a UE transmitting an uplink transmission without grant in accordance with a resource group having a configuration that maps an initial uplink transmission without grant and a non-zero number of re-transmissions without grant to sub-regions of a grant-free region of a time-frequency resource.

In some embodiments of the method of the second aspect of the present disclosure the configuration of the resource group is such that a modulation and coding scheme (MCS) level for each re-transmission without grant is a same or lower than a MCS level for a corresponding preceding uplink transmission without grant or re-transmission without grant by the UE.

In some embodiments of the method of the second aspect of the present disclosure the method further includes receiving, by the UE, a resource configuration message to configure sub-regions and numerology for the initial uplink transmission without grant, and sub-regions and numerology for each re-transmission without grant.

In some embodiments of the method of the second aspect of the present disclosure the resource configuration message comprises an indication of the number of retransmissions.

In some embodiments of the method of the second aspect of the present disclosure the configuration of the resource group is based upon target signal quality or reliability level of the received grant free transmission.

In some embodiments of the method of the second aspect of the present disclosure the method further includes receiving, through a higher layer signaling, a configuration message instructing the UE to use the resource group for uplink transmission without grant.

In some embodiments of the method of the second aspect of the present disclosure each one of the sub-regions is associated with a different numerology.

In some embodiments of the method of the second aspect of the present disclosure the resource group maps the initial uplink transmission without grant and the non-zero number of successive re-transmissions without grant to sub-regions of the grant-free region of the time-frequency resource such that the re-transmissions without grant occupy a gradually increasing amount of time resources, frequency resources, or both.

In some embodiments of the method of the second aspect of the present disclosure the resource group is among a plurality of pre-configured resource groups, each pre-configured resource group in the plurality being associated with a group index, and the UE changes to another pre-configured resource group responsive to receiving a message indicating the group index associated with the other pre-configured resource group.

In some embodiments of the method of the second aspect of the present disclosure the message indicating the group index associated with the other pre-configured resource group is received through higher layer Radio Resource Control (RRC) signaling.

In some embodiments of the method of the second aspect of the present disclosure the message indicating the group index associated with the other pre-configured resource group is received within a UE-specific downlink control information (DCI) message or on a group common DCI.

In some embodiments of the method of the second aspect of the present disclosure the method further includes terminating re-transmissions without grant in response to any of the following: the UE receiving an acknowledgement or DCI from a base station indicating a transport block transmitted by the UE has been successfully decoded; the number of re-transmissions without grant reaching the maximum number.

A third aspect of the present disclosure provides a base station that includes: a wireless communications interface; a memory storage comprising instructions; and one or more processors in communication with the memory storage and the wireless communications interface. The one or more processors execute the instructions to receive an uplink transmission without grant from a UE in accordance with a resource group that maps an initial uplink transmission without grant and a non-zero number of re-transmissions without grant to sub-regions of a grant-free region of a time-frequency resource.

In some embodiments of the base station of the third aspect of the present disclosure the resource group is pre-configured such that a modulation and coding scheme (MCS) level for each re-transmission without grant is a same or lower than a MCS level for a corresponding preceding uplink transmission without grant or re-transmission without grant by the UE.

In some embodiments of the base station of the third aspect of the present disclosure the one or more processors execute the instructions to send a resource configuration message to the UE to configure sub-regions and numerology for the initial uplink transmission without grant, and sub-regions and numerology for each re-transmission without grant.

In some embodiments of the base station of the third aspect of the present disclosure the one or more processors execute the instructions to transmit, through a higher layer signaling, a configuration message to instruct the UE to use the resource group for uplink transmission without grant.

A third aspect of the present disclosure provides a user equipment (UE) that includes: a wireless communications interface; a memory storage comprising instructions; and one or more processors in communication with the memory storage and the wireless communications interface. The one or more processors execute the instructions to transmit an uplink transmission without grant in accordance with a resource group that maps an initial uplink transmission without grant and a non-zero number of re-transmissions without grant to sub-regions of a grant-free region of a time-frequency resource.

In some embodiments of the UE of the fourth aspect of the present disclosure the resource group is pre-configured such that a modulation and coding scheme (MCS) level for each re-transmission without grant is a same or lower than a MCS level for a corresponding preceding uplink transmission without grant or re-transmission without grant by the UE.

In some embodiments of the UE of the fourth aspect of the present disclosure the one or more processors execute the instructions to receive a resource configuration message to configure sub-regions and numerology for the initial uplink transmission without grant, and sub-regions and numerology for each re-transmission without grant.

In some embodiments of the UE of the fourth aspect of the present disclosure the one or more processors execute the instructions to receive, through a higher layer signaling, a configuration message instructing the UE to use the resource group for uplink transmission without grant.

A fifth aspect of the present disclosure provides a method for supporting uplink transmission without grant in a wireless network, the method comprising: a base station tracking a performance metric of uplink transmissions without grant and retransmissions without grant of received transport blocks (TBs) from a user equipment (UE); and based on a result of the tracking of the performance metric, the base station transmitting a command to adjust a modulation and coding scheme (MCS) to be used by the UE for uplink transmission without grant.

Embodiments of the fifth aspect of the present disclosure may include any one or more of the following:

the performance metric comprises an average residual block error rate (BLER);

the MCS used by the UE for uplink transmission without grant is adjusted by the UE dynamically, in a closed-loop configuration;

tracking the performance metric over uplink transmissions without grant and retransmissions without grant of received TBs from the UE comprises comparing the performance metric to a target performance metric; and transmitting the command based on the result of the tracking comprises transmitting the command based on a result of the comparing;

further comprising: the base station updating an expected MCS level for blind detection of transmissions without grant from the UE based on the command transmitted to the UE;

the command indicates an adjustment in terms of an MCS level index, each MCS level index being mapped to a respective MCS level;

the adjustment is selected from a group that includes an increase in terms of the MCS level index, a decrease in terms of the MCS level index, and no change to the MCS level index;

the command indicates a signed MCS level index offset to be applied to a current MCS level index of the UE;

each command comprises a code of at least two bits;

the closed loop MCS command codes are configured such that a maximum hamming distance is used between the commands of opposite signs;

transmitting the command comprises transmitting the command as part of downlink control information (DCI) using a dedicated downlink control channel;

transmitting the command as part of DCI comprises periodically transmitting the command over a dedicated UE-specific DCI;

transmitting the command as part of DCI comprises periodically transmitting the command over a group DCI;

for UE-specific DCI, a no-change MCS command is signalled implicitly by the base station by not sending the UE-specific DCI message;

for group DCI that indicates an intended subset of UEs in a group, a no-change MCS command is signalled implicitly to the UE by not including the UE in the intended subset of UEs indicated in the group DCI;

transmitting the command comprises transmitting the command together with a dynamic closed loop uplink transmit power control command as part of the DCI for the UE;

further comprising: the base station determining the dynamic closed loop uplink transmit power control command based in part on applying the command to a current MCS level of the UE;

further comprising: the base station detecting the current MCS level of the UE from a latest transmission format used by the UE; the base station tracking a sequence of commands transmitted for the UE since an initial MCS level to determine an expected MCS level for the UE; the base station comparing the current MCS level of the UE and the expected MCS level of the UE; and the base station setting transmit power of the dedicated downlink control channel based in part on identifying mismatches between expected and current MCS levels of the UE;

transmitting the command comprises: encoding the command to generate a scrambled sequence; mapping the scrambled sequence to orthogonal physical resources as part of an associated dynamic closed loop link adaptation (DCLLA) group; and transmitting the associated DCLLA group over a downlink control channel;

encoding the command comprises applying repetition or a parity bit to the command before binary phase shift keying (BPSK) modulation is applied;

the dedicated downlink acknowledgement channel is a Physical Hybrid-Automatic-Repeat-reQuest (HARQ) Indicator Channel (PHICH) that carries HARQ acknowledgements (ACKs/NACKs) for uplink data transmissions;

the HARQ acknowledgements (ACKs/NACKs) are encoded and mapped to PHICH groups and the DCLLA groups and PHICH groups are frequency multiplexed in the PHICH according to a frequency multiplexing rule;

the uplink HARQ acknowledgement design supports multiple simultaneously transmitted TBs in a given subframe; and encoding the command comprises appending the command to a HARQ ACK/NACK codeword representing multiple TBs, followed by encoding and mapping to resource groups (REGs) in the PHICH;

further comprising: the base station determining an initial MCS level for the UE based on the UE's long term path loss (PL);

A sixth aspect of the present disclosure provides a method for supporting uplink transmission without grant in a wireless network, the method comprising: a base station receiving uplink transmission without grant from a UE in accordance with a pre-configured resource group that maps an initial uplink transmission without grant and a non-zero number of re-transmissions without grant to sub-regions of a grant-free region of a time-frequency resource such that each re-transmission without grant has the same or lower modulation and coding scheme (MCS) level as a corresponding preceding uplink transmission without grant or re-transmission without grant by the UE.

Embodiments of the sixth aspect of the present disclosure may include any one or more of the following:

the pre-configured resource group maps the initial uplink transmission without grant and the non-zero number of successive re-transmissions without grant to sub-regions of the grant-free region of the time-frequency resource such that the re-transmissions without grant occupy a gradually increasing amount of time resources, frequency resources, or both;

the pre-configured resource group is configured such that: the initial uplink transmission without grant is mapped to a slot within a first sub-region with a first sub-carrier spacing (SCS), wherein subsequent re-transmissions without grant are mapped to slots within sub-regions with SCSs that are increasingly narrower than the first SCS over the course of the re-transmissions without grant;

the pre-configured resource group is configured such that: the initial uplink transmission without grant is mapped to a slot within a first sub-region with a first sub-carrier spacing (SCS); and at least one subsequent re-transmission without grant is mapped to a mini-slot within a sub-region with a SCS that is narrower than the first SCS;

the pre-configured resource group is configured such that: the initial uplink transmission without grant is mapped to a slot within a first sub-region with a first sub-carrier spacing, the initial uplink transmission without grant mapped to the slot within the first sub-region occupying a first number of frequency resources in the first sub-region; and subsequent re-transmissions without grant are mapped to slots within other sub-regions with the same SCS as the first sub-region, but the subsequent re-transmissions without grant occupy an increasing number of frequency resources within the slots;

the pre-configured resource group is configured such that: the initial uplink transmission without grant is mapped to a mini-slot within a first sub-region with a first sub-carrier spacing (SCS); and subsequent re-transmissions without grant are mapped to mini-slots or slots within other sub-regions with the same SCS as the first sub-region, the mini-slots or slots within the other sub-regions including an increasing number of orthogonal frequency divisional multiplexing (OFDM) symbols;

the pre-configured resource group is configured such that: the initial uplink transmission without grant is mapped to a mini-slot within a first sub-region with a first sub-carrier spacing (SCS); a re-transmission without grant is mapped to a mini-slot within a second sub-region with the same SCS as the first sub-region, wherein the mini-slot within the second sub-region includes a greater number of orthogonal frequency divisional multiplexing (OFDM) symbols than the mini-slot within the first sub-region and the re-transmission without grant mapped to the min-slot within the second sub-region occupies the same number of frequency resources as the initial uplink transmission without grant; and a subsequent re-transmission without grant is mapped to a mini-slot or slot within a third sub-region with the same SCS as the first sub-region, wherein the mini-slot or slot within the third sub-region includes a greater number of OFDM symbols than the mini-slot within the second sub-region, and the re-transmission without grant mapped to the min-slot or slot within the third sub-region occupies fewer frequency resources, such that overall the re-transmission without grant mapped to the min-slot or slot within the third sub-region occupies a greater number of time-frequency resources than the re-transmission without grant mapped to the min-slot within the second sub-region;

the pre-configured resource group is configured such that: the initial uplink transmission without grant is mapped to bundled mini-slots within a first sub-region with a first sub-carrier spacing (SCS); and at least one subsequent re-transmission without grant is mapped to bundled mini-slots or bundled slots within another sub-region with the same SCS as the first sub-region, the at least one subsequent re-transmission without grant including a greater number of OFDM symbols than the initial uplink transmission without grant, and therefore occupying a greater number of time resources within those bundled mini-slots or slots;

the pre-configured resource group is among a plurality of pre-configured resource groups, each pre-configured resource group in the plurality being associated with a group index, the base station instructs the UE to change to another pre-configured resource group by transmitting a message to the UE indicating the group index associated with the other pre-configured resource group;

the message indicating the group index associated with the other pre-configured resource group is transmitted through higher layer Radio Resource Control (RRC) signaling;

the message indicating the group index associated with the other pre-configured resource group is transmitted within a UE-specific downlink control information (DCI) message or on a group common DCI;

the message indicating the group index associated with the other pre-configured resource group further comprises information indicating an interval in which the UE should use the other pre-configured resource group before switching to a default pre-configured resource group;

further comprising: the base station instructing the UE to change to another pre-configured resource group based on at least one of: mobility of the UE; and a change in channel conditions and target latency and/or reliability;

further comprising: the base station instructing the UE to change to another pre-configured resource group based on detecting a transport block (TB) size in a new uplink transmission without grant that is larger or smaller than a default TB size;

detecting a transport block (TB) size in a new uplink transmission without grant that is larger than a default TB size comprises: detecting that the UE used a pre-configured MCS level in accordance with the pre-configured resource group but bundled slots/mini-slots to accommodate a larger TB size in order to fit a larger packet size or a Radio Link Control (RLC) concatenation of multiple queued packets;

detecting a transport block (TB) size in a new uplink transmission without grant that is smaller than a default TB size comprises: detecting that the UE used a pre-configured MCS level in accordance with the pre-configured resource group but with padded data over the pre-configured resource in use, or the UE's uplink transmission without grant occupied less resources than pre-configured in use, indicating a smaller packet size;

further comprising: in response to successfully decoding a transport block received from the UE, the base station transmitting an acknowledgement to the UE;

further comprising: the base station tracking an average residual block error rate (BLER) over uplink transmissions without grant and retransmissions of received transport blocks (TBs) from a user equipment (UE); and based on a result of the tracking of the average residual BLER, the base station transmitting a dynamic closed loop modulation and coding scheme (MCS) command to adjust a MCS level used by the UE for uplink transmission without grant;

tracking the residual BLER over uplink transmissions without grant and retransmissions without grant of received TBs from the UE comprises comparing the average residual BLER to a target BLER; and transmitting the command based on the result of the tracking comprises transmitting the dynamic closed MCS command based on a result of the comparing;

further comprising: the base station updating an expected MCS level for blind detection of transmissions without grant from the UE based on the command transmitted to the UE;

the command indicates an adjustment in terms of an MCS level index, each MCS level index being mapped to a respective MCS level;

the adjustment is selected from a group that comprises an increase in terms of the MCS level index, a decrease in terms of the MCS level index, and no change to the MCS level index;

transmitting the command comprises transmitting the command as part of downlink control information (DCI) using a dedicated downlink control channel;

transmitting the command as part of DCI comprises periodically transmitting the command over a dedicated UE-specific DCI;

transmitting the command as part of DCI comprises periodically transmitting the command over a group DCI;

for UE-specific DCI, a no-change MCS command is signalled implicitly by the base station by not sending the UE-specific DCI message;

for group DCI that indicates an intended subset of UEs in a group, a no-change MCS command is signalled implicitly to the UE by not including the UE in the intended subset of UEs indicated in the group DCI;

transmitting the command comprises transmitting the command together with a dynamic closed loop uplink transmit power control command as part of the DCI for the UE;

further comprising: the base station determining the dynamic closed loop uplink transmit power control command based in part on applying the command to a current MCS level of the UE;

transmitting the command comprises: encoding the command to generate a scrambled sequence; mapping the scrambled sequence to orthogonal physical resources as part of an associated dynamic closed loop link adaptation (DCLLA) group; and transmitting the associated DCLLA group over a downlink control channel;

encoding the command comprises applying repetition or a parity bit to the command before binary phase shift keying (BPSK) modulation is applied;

the downlink control channel is a dedicated downlink acknowledgement channel that carries acknowledgements for uplink data transmissions;

the dedicated downlink acknowledgement channel is a Physical Hybrid-Automatic-Repeat-reQuest (HARQ) Indicator Channel (PHICH) that carries HARQ acknowledgements (ACKs/NACKs) for uplink data transmissions;

the HARQ acknowledgements (ACKs/NACKs) are encoded and mapped to PHICH groups and the DCLLA groups and PHICH groups are frequency multiplexed in the PHICH according to a frequency multiplexing rule;

the uplink HARQ acknowledgement design supports multiple simultaneously transmitted TBs in a given subframe; and encoding the command comprises appending the command to a HARQ ACK/NACK codeword representing multiple TBs, followed by encoding and mapping to resource groups (REGs) in the PHICH;

tracking the average residual (BLER) over uplink transmissions without grant and retransmissions without grant of received TBs comprises employing a physical layer (PHY) abstraction signal-to-interference-plus-noise ratio-to-BLER (SINR-to-BLER) mapping to map combined SINR to residual BLER for each TB;

A seventh aspect of the present disclosure provides a base station configured to implement a method according to the fifth or sixth aspect of the present disclosure.

An eighth aspect of the present disclosure provides a method for supporting uplink transmission without grant in a wireless network, the method comprising: a user equipment (UE) receiving, from a base station, a command to adjust a modulation and coding scheme (MCS) to be used by the UE for uplink transmission without grant, the command being received as part of downlink control information (DCI) on a dedicated downlink control channel; the UE adjusting an MCS level for uplink transmission without grant in accordance with the command; and the UE transmitting an uplink transmission without grant in accordance with the adjusted MCS level.

Embodiments of the eighth aspect of the present disclosure may include any one or more of the following:

the command indicates an adjustment in terms of an MCS level index, each MCS level index being mapped to a respective MCS level;

the adjustment is selected from a group that comprises an increase in terms of the MCS level index, a decrease in terms of the MCS level index, and no change to the MCS level index;

the command indicates a signed MCS level index offset to be applied to a current MCS level index of the UE;

the command comprises a code of at least two bits;

the closed loop MCS command codes are configured such that a maximum hamming distance is used between the commands of opposite signs;

receiving the command as part of DCI comprises receiving the command over a dedicated UE-specific DCI;

wherein receiving the command as part of DCI comprises receiving the command over a dedicated group DCI;

further comprising receiving the command together with a dynamic closed loop uplink transmit power control command as part of the DCI.

A ninth aspect of the present disclosure provides a method for supporting uplink transmission without grant in a wireless network, the method comprising: a UE receiving, from a base station as part of an dynamic closed loop link adaptation (DCLLA) group on a Physical Hybrid-Automatic-Repeat-reQuest (HARQ) Indicator Channel (PHICH) that carries HARQ acknowledgements encoded and mapped to PHICH groups, a command to adjust a modulation and coding scheme (MCS) to be used by the UE for uplink transmission without grant, wherein DCLLA groups and PHICH groups are frequency multiplexed in the PHICH; the UE adjusting an MCS level for uplink transmission without grant in accordance with the command; and the UE transmitting an uplink transmission without grant in accordance with the adjusted MCS level.

A tenth aspect of the present disclosure provides a method for supporting uplink transmission without grant in a wireless network, the method comprising: a user equipment (UE) transmitting uplink transmissions without grant in accordance with a pre-configured resource group that maps an initial uplink transmission without grant and a non-zero number of re-transmissions without grant to sub-regions of a grant-free region of a time-frequency resource such that each re-transmission without grant has the same or lower modulation and coding scheme (MCS) level as a corresponding preceding uplink transmission without grant or re-transmission without grant by the UE.

Embodiments of the tenth aspect of the present disclosure may include any one or more of the following:

the pre-configured resource group maps the initial uplink transmission without grant and the non-zero number of successive re-transmissions without grant to sub-regions of the grant-free region of the time-frequency resource such that the re-transmissions without grant occupy a gradually increasing amount of time resources, frequency resources, or both;

the pre-configured resource group is configured such that: the initial uplink transmission without grant is mapped to a slot within a first sub-region with a first sub-carrier spacing (SCS), wherein subsequent re-transmissions without grant are mapped to slots within sub-regions with SCSs that are increasingly narrower than the first SCS over the course of the re-transmissions without grant;

the pre-configured resource group is configured such that: the initial uplink transmission without grant is mapped to a slot within a first sub-region with a first sub-carrier spacing (SCS); and at least one of the subsequent re-transmissions without grant is mapped to a mini-slot within a sub-region with a SCS that is narrower than the first SCS;

the pre-configured resource group is configured such that: the initial uplink transmission without grant is mapped to a slot within a first sub-region with a first sub-carrier spacing, the initial uplink transmission without grant mapped to the slot within the first sub-region occupying a first number of frequency resources in the first sub-region; and subsequent re-transmissions without grant are mapped to slots within other sub-regions with the same SCS as the first sub-region, but the subsequent re-transmissions without grant occupy an increasing number of frequency resources within those slots;

the pre-configured resource group is configured such that: the initial uplink transmission without grant is mapped to a mini-slot within a first sub-region with a first sub-carrier spacing (SCS); and subsequent re-transmissions without grant are mapped to mini-slots or slots within other sub-regions with the same SCS as the first sub-region, the mini-slots or slots within the other sub-regions including an increasing number of orthogonal frequency divisional multiplexing (OFDM) symbols, and therefore occupying an increasing number of time resources;

the pre-configured resource group is configured such that: the initial uplink transmission without grant is mapped to a mini-slot within a first sub-region with a first sub-carrier spacing (SCS); a re-transmission without grant is mapped to a mini-slot within a second sub-region with the same SCS as the first sub-region, wherein the mini-slot within the second sub-region includes a greater number of orthogonal frequency divisional multiplexing (OFDM) symbols than the mini-slot within the first sub-region and the re-transmission without grant mapped to the min-slot within the second sub-region occupies the same number of frequency resources as the initial uplink transmission without grant; and a subsequent re-transmission without grant is mapped to a mini-slot or slot within a third sub-region with the same SCS as the first sub-region, wherein the mini-slot or slot within the third sub-region includes a greater number of OFDM symbols than the mini-slot within the second sub-region, and the re-transmission without grant mapped to the min-slot or slot within the third sub-region occupies fewer frequency resources, such that overall the re-transmission without grant mapped to the min-slot or slot within the third sub-region occupies a greater number of time-frequency resources than the re-transmission without grant mapped to the min-slot within the second sub-region;

the pre-configured resource group is configured such that: the initial uplink transmission without grant is mapped to bundled mini-slots within a first sub-region with a first sub-carrier spacing (SCS); and at least one subsequent re-transmission without grant is mapped to bundled mini-slots or bundled slots within another sub-region with the same SCS as the first sub-region, the at least one subsequent re-transmission without grant including a greater number of OFDM symbols than the initial uplink transmission without grant, and therefore occupying a greater number of time resources within those bundled mini-slots or slots;

the pre-configured resource group is among a plurality of pre-configured resource groups, each pre-configured resource group in the plurality being associated with a group index, the method further comprising: the UE receiving a message from the base station indicating a group index associated with a different pre-configured resource group among the plurality of pre-configured resource groups; and the UE transmitting uplink transmissions without grant in accordance with the different pre-configured resource group;

the message indicating the group index associated with the other pre-configured resource group is received through higher layer Radio Resource Control (RRC) signaling;

the message is received within a UE-specific downlink control information (DCI) message or on a group common DCI;

the message further comprises information indicating an interval in which the UE should use the other pre-configured resource group before switching to a default pre-configured resource group;

further comprising: the UE changing to another pre-configured resource group based on a transport block (TB) size for a new uplink transmission without grant that is larger or smaller than a default TB size;

changing to another pre-configured resource group comprises changing to another pre-configured MCS level in accordance with the current pre-configured resource group but with bundled slots/mini-slots to accommodate a larger TB size;

transmitting uplink transmissions without grant in accordance with a pre-configured resource group comprises: transmitting padded data over the pre-configured resource in use, or transmitting an uplink transmission without grant that occupies less resources than pre-configured in use;

further comprising: the UE receiving, from the base station as part of downlink control information (DCI) on a dedicated downlink control channel, a command to adjust a modulation and coding scheme (MCS) to be used by the UE for uplink transmission without grant; the UE adjusting an MCS level for uplink transmission without grant in accordance with the command; and the UE transmitting an uplink transmission without grant in accordance with the adjusted MCS level;

the command indicates an adjustment in terms of an MCS level index, each MCS level index being mapped to a respective MCS level;

the adjustment is selected from a group that comprises an increase in terms of the MCS level index, a decrease in terms of the MCS level index, and no change to the MCS level index;

the command indicates a signed MCS level index offset to be applied to a current MCS level index of the UE;

the command comprises a code of at least two bits;

the closed loop MCS command codes are configured such that a maximum hamming distance is used between the commands of opposite signs;

transmitting the command as part of DCI comprises receiving the command as part of a dedicated UE-specific DCI;

receiving the command as part of DCI comprises receiving the command as part of a group DCI;

further comprising receiving the command together with a dynamic closed loop uplink transmit power control command as part of the DCI;

further comprising: the UE receiving, from the base station as part of an dynamic closed loop link adaptation (DCLLA) group on a Physical Hybrid-Automatic-Repeat-reQuest (HARQ) Indicator Channel (PHICH) that carries HARQ acknowledgements encoded and mapped to PHICH groups, a command to adjust a modulation and coding scheme (MCS) to be used by the UE for uplink transmission without grant, wherein DCLLA groups and PHICH groups are frequency multiplexed in the PHICH; the UE adjusting an MCS level for uplink transmission without grant in accordance with the command; and the UE transmitting an uplink transmission without grant in accordance with the adjusted MCS level;

An eleventh aspect of the present disclosure provides a UE configured to perform a method according to any of the eighth, ninth or tenth aspects of the present disclosure.

DETAILED DESCRIPTION

For illustrative purposes, specific example embodiments will now be explained in greater detail below in conjunction with the figures.

Figure 1:
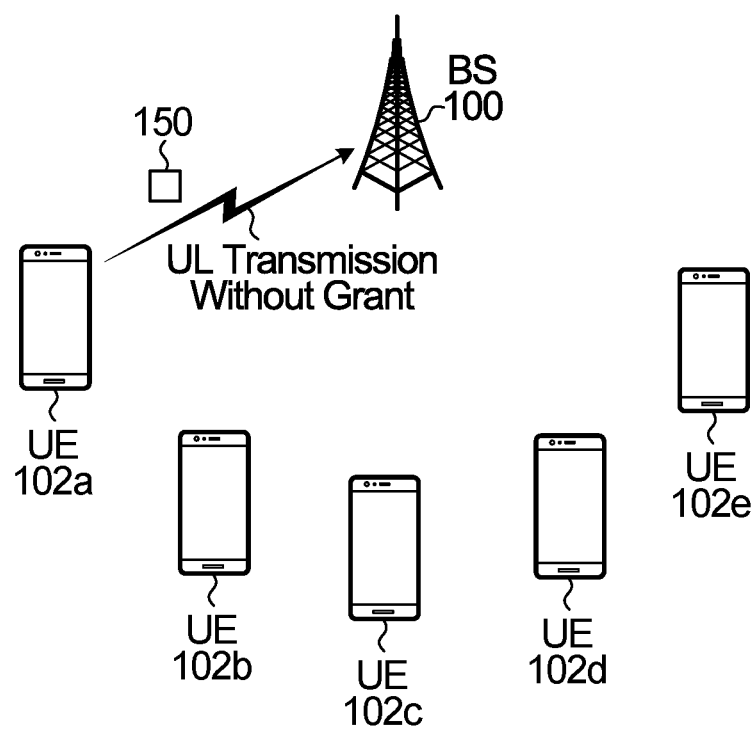
FIG. 1 illustrates a block diagram of a wireless network for communicating data.

FIG. 1 is a block diagram of a base station 100 and a plurality of UEs 102a-e, according to one embodiment.

The word "base station" encompasses any device that wirelessly receives data in the uplink from wireless devices, such as UEs 102a-e. The base station 100 is an example of a network access device that provides network access to UEs 102a-e and as such, is generally meant to be representative of other types of access devices including a transmit and receive point, a base transceiver station, a radio base station, a radio access node, a network node, a transmit/receive node, a Node B, an eNode B (eNB), a gNB (sometimes called a "gigabit" Node B), a relay station, a remote radio head, or an Access Point (AP). Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations (e.g. message decoding and message generation) that are not necessarily part of the equipment housing the antennas of the base station 100. The modules may also be coupled to other base stations. In some embodiments, the base station 100 may actually be a plurality of base stations that are operating together to serve the UEs 102a-e, e.g. through coordinated multipoint transmissions. Similarly, UEs 102a-e are also meant to be illustrative of other end user devices which may be configured as disclosed herein for uplink communications with the base station 100. Examples of other user devices include wireless transmit/receive units (WTRUs), mobile stations, wireless devices, fixed or mobile subscriber units, cellular telephones, personal digital assistants (PDAs), smart phones, laptops, computers, touchpads, wireless sensors, and consumer electronics devices.

In operation, UEs 102a-e may each send uplink transmissions without grant to the base station 100. An uplink transmission without grant is an uplink transmission that is sent using uplink resources not specifically granted to the UE by the base station 100. An uplink transmission without grant does not need a dynamic and explicit scheduling grant from the base station 100. A UE sending an uplink transmission without grant, or configured to send an uplink transmission without grant, may be referred to as operating in "grant-free mode" or "without grant mode".

Uplink transmissions without grant are sometimes called "grant-free", "grant-less", "schedule free", or "schedule-less" transmissions, or transmissions without grant. Uplink transmissions without grant from different UEs 102a-e may be transmitted using the same designated resources, in which case the uplink transmissions without grant are contention-based transmissions. Uplink transmissions without grant may be suitable for transmitting bursty traffic with short packets from the UEs 102a-e to the base station 100, and/or for transmitting data to the base station 100 in real-time or with low-latency. Examples of applications in which an uplink transmission without grant scheme may be utilized include: massive machine type communication (m-MTC), ultra-reliable low latency communications (URLLC), smart electric meters, teleprotection in smart grids, and autonomous driving. However, schemes or configurations for uplink transmission without grant are not limited to these applications.

The uplink resources on which transmissions without grant are sent will be referred to as "grant-free uplink resources". For example, the grant-free uplink resources may be a designated region in an OFDMA frame. The UEs 102a-e may use the designated region to send their uplink transmissions without grant, but the base station 100 does not know which of the UEs 102a-e, if any, are going to send an uplink transmission without grant in the designated region.

In some embodiments, the grant-free uplink resources may be pre-configured, e.g. there may be a plurality of possible predefined grant-free uplink resource partitions, and the base station 100 or the network may semi-statically pick one or a group of the predefined grant-free uplink resource partitions and signal to the UE the grant-free uplink resource partition or group to be used. In some embodiments, the base station 100 and/or the UEs may be configured during their manufacture to know which uplink resource groups to use as grant-free uplink resources, e.g. through predefined tables loaded during manufacture. In some embodiments, the grant-free uplink resources may be semi-statically configured by the base station 100, e.g. by using a combination of broadcast signalling, higher layer signalling (e.g. RRC signalling) and dynamic signalling (e.g. downlink control information). By dynamically signaling the grant-free uplink resources, the base station may adapt to the system traffic load of the UEs. For example, more grant-free uplink resources may be allocated when there are more UEs being served that may send uplink transmissions without grant. In some embodiments, a control node (e.g. a computer) in the network may determine the grant-free uplink resources to be used. The network may then indicate the grant-free uplink resources to the base station and the UEs. In some embodiments, a UE operating in grant-free mode may be semi-statically configured to combine the following information to determine an assigned grant-free transmission resource: 1) the RRC signaling information and the system information; or 2) the RRC signaling information and the downlink control information (DCI); or 3) the RRC signaling information, the system information and the DCI information.

FIG. 1 illustrates a message 150 being sent by UE 102*a* in an uplink transmission without grant over uplink channel 156. Uplink transmissions from the UEs 102*a-e*, such as message 150, may be performed on a set of time-frequency resources.

Figure 2:
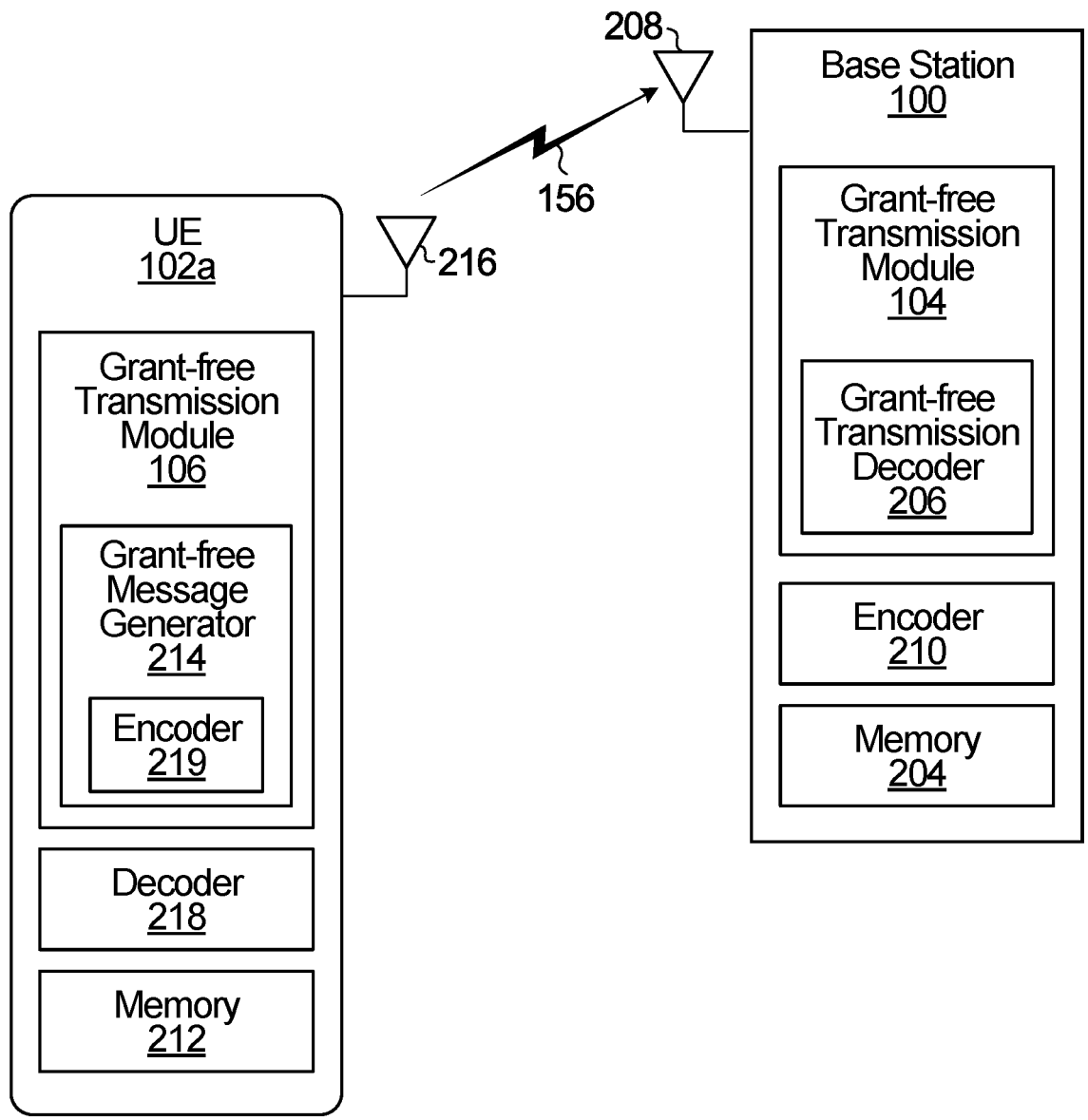
FIG. 2 is a block diagram showing the base station 100 and UE 102a of FIG. 1 in more detail.

FIG. 2 is a block diagram showing the base station 100 and UE 102*a* of FIG. 1 in more detail. The base station 100 includes a grant-free transmission module 104 for processing transmissions without grant received from UEs 102*a-e* and for participating in the HARQ methods described herein relating to the received transmissions without grant. For example, the grant-free transmission module 104 may include a grant-free transmission decoder 206. The base station further includes an encoder 210 for encoding information, such as HARQ feedback, destined for the UEs 102*a-e*. The base station 100 also includes one or more antennas 208 for receiving uplink transmissions without grant from the UEs 102*a-e* and sending messages to the UEs 102*a-e* in the downlink. Only one antenna 208 is illustrated. The base station 100 further includes memory 204. The base station 100 further includes other components for operation, e.g. to implement the physical layer, but these have been omitted for the sake of clarity.

The grant-free transmission module 104 and its components (e.g. the grant-free transmission decoder 206), as well as the encoder 210, may be implemented by one or more processors that execute instructions that cause the one or more processors to perform the operations of the encoder 210 and the grant-free transmission module 104 and its components. Alternatively, the encoder 210 and the grant-free transmission module 104 and its components may be implemented using dedicated integrated circuitry, such as an application specific integrated circuit (ASIC), a graphics processing unit (GPU), or a programmed field programmable gate array (FPGA) for performing the operations of the encoder 210 and the grant-free transmission module 104 and its components.

The UE 102*a* also includes a complementary grant-free transmission module 106 for generating and sending grant-free messages and for participating in the HARQ methods described herein related to the grant-free messages. For example, the grant-free transmission module 106 includes a grant-free message generator 214 for generating messages to be transmitted in uplink transmissions without grant. Generating a grant-free message may include encoding, in encoder 219, the data to be transmitted in the message, and modulating the encoded data. The UE 102*a* further includes a decoder 218 for decoding information from the base station 100. The UE 102*a* further includes one or more antennas 216 for transmitting grant-free uplink transmissions and receiving messages from the base station 100 in the downlink. Only one antenna 216 is illustrated. The UE 102*a* further includes memory 212. The UE 102*a* further includes other components for operation, e.g. to implement the physical layer, but these have been omitted for the sake of clarity.

The grant-free transmission module 106 and its components (e.g. the grant-free message generator 214), as well as the decoder 218, may be implemented by one or more processors that execute instructions that cause the one or more processors to perform the operations of the decoder 218 and the grant-free transmission module 106 and its components. Alternatively, the decoder 218 and the grant-free transmission module 106 and its components may be implemented using dedicated integrated circuitry, such as an ASIC, GPU, or a programmed FPGA for performing the operations of the decoder 218 and the grant-free transmission module 106 and its components.

The UEs 102*b-e* are not shown in detail in the figures, but UEs 102*b-e* may have the same components as UE 102*a* illustrated in FIG. 2.

Returning to FIG. 1, UE 102*a-e* are each able to send uplink transmissions without grant to base station 100. For example, message 150 is illustrated as being transmitted by UE 102*a* via an uplink transmission without grant.

Figure 3:
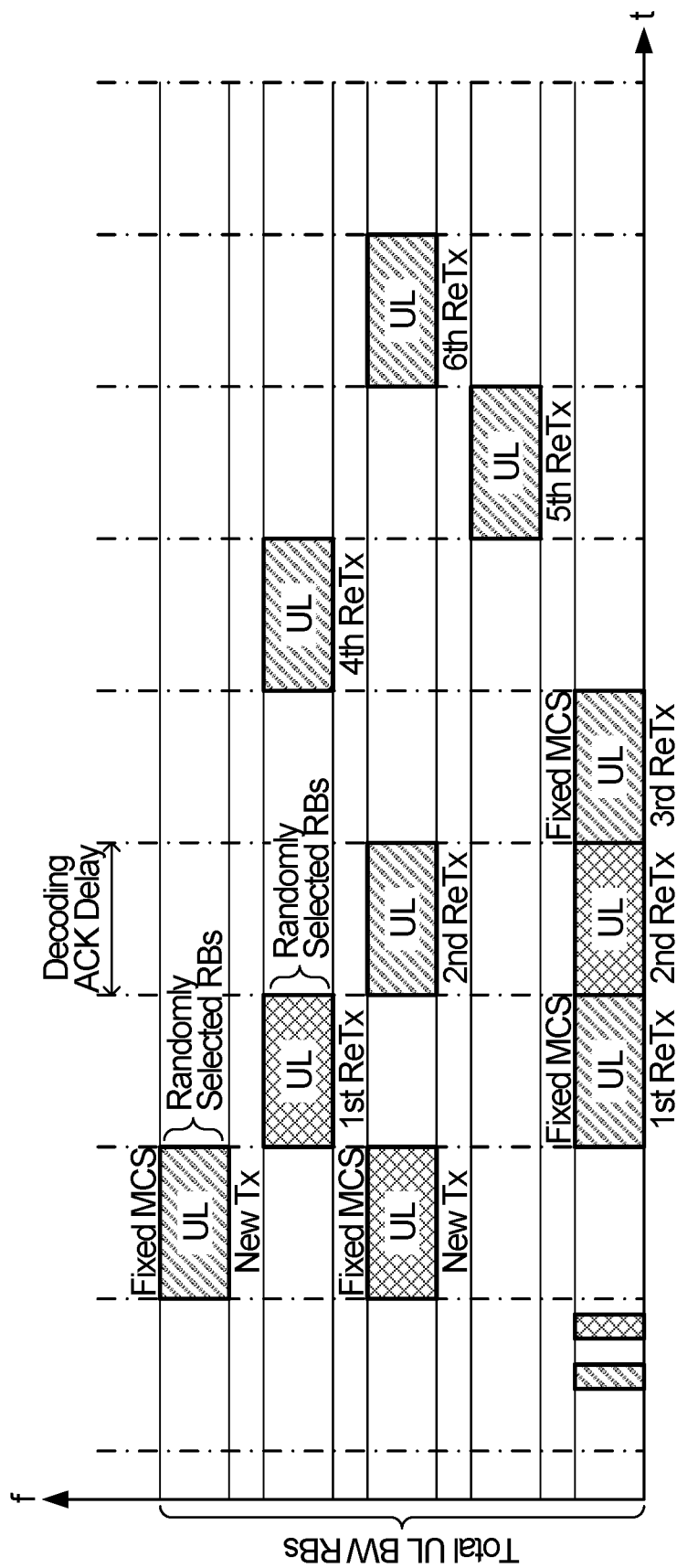
FIG. 3 is an example of a conventional mapping of initial transmissions and retransmissions to randomly selected resource blocks using fixed MCSs.

Grant-free transmission eliminates the latency and control overhead associated with grant-based procedures and can allow for more retransmissions/repetitions to increase reliability. However, due to the lack of uplink scheduling, adaptive modulation and coding (AMC), and grant signaling, without grant UEs are typically pre-configured to use a fixed modulation and coding scheme (MCS) level for all transmissions and retransmissions, e.g., grant-free UEs may be configured to use the most reliable MCS level for a given resource unit for grant-free uplink transmissions. An example of such a conventional configuration for uplink transmissions without grant and retransmission is shown in FIG. 3, which shows a mapping of transmissions and retransmissions to randomly selected resource blocks and the use of fixed MCS for all transmissions and retransmissions.

Enabling link adaptation for uplink transmissions without grant potentially offers several benefits, such as:
Uplink transmissions may occupy fewer resources, e.g., UEs with good link qualities may be able to use fewer resources by using higher MCS levels;
Spectral efficiency may be increased and thus the grant-free system capacity may similarly be increased; and
Target reliability, or equivalently, target residual block error rate (BLER), may be attained more efficiently.

Two mechanisms are proposed in the present disclosure to enable link adaptation for uplink transmissions without grant.

The first mechanism provides dynamic closed loop link adaptation (DCLLA) MCS commands through layer 1 (L1) and/or layer 2 (L2) signaling. This mechanism follows an approach similar to that of uplink dynamic closed loop transmit power control to achieve a target performance metric, such as residual BLER. Other performance metrics that may serve as a target performance metric as a basis for DCLLA include, but are not limited to:

The percentage of decoding instances at BS resulting in NACKs, or decoding failures if ACK/NACK feedback is not supported, compared to a target threshold;

The percentage of decoding instances at BS resulting in ACKs, or decoding successes if ACK/NACK feedback is not supported, compared to a target threshold;

The SINR gap between the received combined SINR (combined over all HARQ retransmissions of each TB) and the target SINR associated with the current MCS level in use; and Decoding Log Likelihood Ratios (LLRs) calculated by the BS when attempting to decode a TB after combining all of its retransmissions and given the current MCS level in use.

The DCLLA MCS command message may be transmitted over a dedicated downlink control channel, e.g. the Physical Downlink Control Channel (PDCCH) or combined with acknowledgement messages over a dedicated downlink acknowledgement channel, e.g. combined with Hybrid Automatic Repeat request (HARQ) acknowledgements (ACKs/NACKs) transmitted over the Physical HARQ Indicator Channel (PHICH).

The second mechanism provides pre-configured resource groups that map initial transmissions without grant and retransmissions without grant to sub-regions of a grant-free time-frequency resource region/space such that retransmissions are mapped to more reliable sub-regions. The sub-regions can be of different numerologies to enable larger resource configurations for the more reliable sub-regions. A grant-free UE's long term geometry or path loss and/or transport block packet size may be used to map the grant-free UE's initial grant-free transmission to a starting sub-region. Sub-regions used for initial transmissions can be configured to support higher MCS levels, thereby reducing the resources needed for the initial transmissions at the expense of possibly supporting less contention within the sub-regions used for initial transmissions.

Example embodiments of the two mechanisms are described below with reference to FIGS. 4 to 12.

DCLLA over Downlink Control Information (DCI)

In one embodiment of the first mechanism described above, a base station transmits DCLLA MCS commands to a UE over DCI messages on a dedicated downlink control channel in order to adjust the MCS level that the UE uses for uplink transmission without grant. The DCI message may identify at least an ID associated with the UE, e.g., a UE radio network temporary identifier (RNTI) or group RNTI, and an MCS increase/decrease command. The increase/decrease command may indicate a default step increase/decrease. In some embodiments, an increase/decrease step other than a default step is indicated as well in the DCI message. For example, the non-default step may be indicated in a separate field in the DCI message, or may be in the same field as the MCS command, e.g., embedded within the MCS command.

In some embodiments, the dedicated downlink control channel is PDCCH. In semi-persistent scheduling (SPS), a UE continuously monitors DCI messages on PDCCH for potential overriding assignments. Dynamic closed loop uplink transmit power control (TPC) commands may be provided as part of the DCI messages on PDCCH, e.g., uplink TPC commands are typically sent over DCI 3/3A in 3GPP Long Term Evolution (LTE)). In some embodiments, uplink MCS commands are combined with the uplink TPC commands in DCI messages, in order to provide a UE with both MCS commands and TPC commands for DCLLA. For example, a new DCI format may be defined that includes a group DCI message field 3B to carry both MCS commands and TPC commands for uplink transmission without grant.

In some embodiments, a UE may only periodically monitor DCI messages. In some embodiments, the period may be set so that the period is equal to a duration of K grant-free repetitions, for example. The period may be configurable by the network through higher layer signaling, such as RRC signaling. In some embodiments, a UE periodically monitors a dedicated group DCI message (similar to DCI 3/3A) carrying the MCS increase/decrease commands. In other embodiments, a UE receives MCS increase/decrease commands periodically over a dedicated UE-specific DCI message. UE-specific DCI messages may be transmitted over a UE-specific search space or over a common search space.

In some embodiments, an MCS command may be sent to a UE only when a base station estimates that an increase/decrease is required. An initial MCS level of a grant-free uplink transmission session may be determined based on a UE's long term geometry or path loss (PL), e.g., cell-edge UEs with higher PL may use initial MCS levels that are lower compared to cell-centre UEs with lower PL.

A base station may estimate that an increase/decrease is required for a grant-free UE based on tracking the average residual block error rate (BLER) over transmissions and retransmissions of all received transport blocks (TBs) from the UE. A physical layer (PHY) abstraction Signal-to-Interference-plus-Noise Ratio to BLER (SINR-to-BLER) mapping may be employed to map combined SINR to residual BLER for each TB. For example, the combined SINR may be calculated at the end of the last retransmission of a TB. A moving average calculation may be employed to update the average residual BLER, e.g.:

$$BLER_{res}^{ave}[k] = (1-\alpha)BLER_{res}^{ave}[k-1] + \alpha \cdot BLER_{res}[k], \quad 0 < \alpha < 1, \quad (1)$$

where k is a discrete sample index and a is a fraction that controls the moving average window size.

The above equation is an example of a recursive equation defining a discrete time filter that may be used in some embodiments of the present disclosure. It should be appreciated that this is merely one specific example of an equation that may be used for a moving average calculation to update the average residual BLER. Embodiments of the present disclosure are in no way limited to this particular equation.

A base station may compare the average residual BLER (average reliability) to a target BLER (target reliability) of the application/service to which the uplink grant-free session belongs in order to determine if an adjustment to a UE's grant-free uplink MCS level is warranted. For example, a base station may decide that a decrease/increase/no-change MCS command, e.g., {−1, +1, 0} is warranted based on a gap or a ratio between the target BLER and the estimated residual BLERs. A step Δstep, (in terms of MCS level index) may be determined by the base station as well; otherwise a default step may be assumed.

(2)

where f( ) is a function that estimates in general an MCS command as a 'direction' $c_k$ (e.g., increase/decrease/no-change) and a 'magnitude' $\Delta_{step}$ (the associated step).

In some embodiments, signaling overhead may be saved by refraining from explicitly transmitting a "no-change" MCS command. For example, if the MCS commands are transmitted over a UE-specific DCI, a no-change command can be implied by the base station by not sending the UE-specific DCI message. Similarly, if MCS commands are transmitted over a group DCI wherein the intended subset of group UEs can be indicated in the group DCI, a no-change command for a given group UE can be implied by the base station by not including the given group UE in the intended subset of group UEs indicated in the group DCI.

In some embodiments, MCS commands are provided as a code of at least two bits. For example, the closed loop MCS command codes may be configured such that a maximum hamming distance is used between the MCS commands of opposite signs (increase and decrease), e.g., {+2 (11), +1 (01), −1 (10), −2(00)}.

In response to receiving an MCS command, a UE updates its current MCS level based on the received MCS command and the indicated step, if any, e.g., the UE may update its current MCS level according to:

$$L_{MCS}[k]=L_{MCS}[k-1]+c_k \cdot \Delta_{step} \qquad (3)$$

where $L_{MCS}[k-1]$ is the current MCS level of the UE, $c_k$ is the MCS command, $\Delta_{step}$ is a scalar multiplier for the MCS command that may not be used in some embodiments, and $L_{MCS}[k]$ is the updated MCS level of the UE.

In some embodiments, the UE may also update its open loop (OL) transmit power control (TPC) level based on the received MCS command and the indicated step, if any.

On the network side, the base station may run a closed loop TPC algorithm and generate dynamic closed loop TPC commands for the UE based on the updated DCLLA MCS command. The base station also applies the MCS update command to the current expected MCS level of the UE (similar to the UE's side update to its current MCS level) to determine an updated expected MCS level for the UE. The base station uses updated MCS level for the UE as the expected MCS level assumed for blind detection of transmissions without grant from the UE.

The base station may have detected a current MCS level for the UE from the most recent transmission format used by the UE for an uplink transmission. The base station may also track the sequence of MCS commands transmitted for a UE since an initial MCS to determine an expected MCS level for the UE. The expected MCS levels for UEs can be cross checked against the respective MCS levels that are actually detected at the base station to estimate the reliability of the downlink control channel over which the DCI messages containing the MCS commands are transmitted. Mismatches between the expected and actual MCS levels may indicate that UEs have not received and decoded the MCS commands. In some embodiments, transmit power of the downlink control channel, e.g., PDCCH, may be increased (contingent on transmit power limitations) based on detecting MSC mismatches. In some embodiments, the actual MCS level detected by the base station overrides the currently assumed MCS level, according to the previously sent MCS commands to that UE, at the base station to realign the DCLLA procedure.

DCLLA Over PHICH or PHICH-Like

In some embodiments, rather than, or in addition to, providing DCLLA MCS commands over DCI, the DCLLA MCS commands are provided over either a dedicated downlink acknowledgement channel, such as PHICH, that also carries acknowledgement messages, e.g., HARQ ACKs/NACKs, or a dedicated PHICH-like channel for which MCS commands are encoded like the ACKs/NACKs of the PHICH but mapped to different resources from the PHICH resources deduced from system information. Such embodiments may be used to provide DCLLA MCS commands to grant-free UEs that monitor PHICH or PHICH-like channels but do not necessarily monitor DCI.

The ACK/NACK messages carried by PHICH may be used to trigger ACK-based termination of repetitions/retransmissions of a TB and/or to trigger NACK-based retransmissions of K repetitions of a TB.

The base station and UE functionalities for transmission of MCS commands over PHICH or a PHICH-like channel are generally the same or similar to those described above for transmission over DCI except that:

From the network side, the base station encodes the UE-specific MCS command similar to UL HARQ ACK/NACK indication bits and maps the respective scrambled sequence to some orthogonal physical resources to form an associated DCLLA group; and From the UE side, the UE uses the same parameters (e.g. starting RB index and/or demodulation reference signal (DMRS) sequence) that it uses to locate its PHICH and extract the ACK/NACK message to locate the associated DCLLA group and extract the MCS commands.

Depending on the length of the MCS command, repetition or adding parity can be applied before BPSK modulation for increased reliability of the associated DCLLA channel.

The MCS commands sent over PHICH or a PHICH-like channel may identify an MCS increase/decrease command as described previously. For example, the increase/decrease command may indicate a default step increase/decrease. In some embodiments, an increase/decrease step other than a default step may be embedded within the MCS command.

In some embodiments, an MCS command may be sent to a UE only when a base station estimates that an increase/decrease is required. An initial MCS level of a grant-free uplink transmission session may be determined based on a UE's long term geometry or path loss (PL), e.g., cell-edge UEs with higher PL may use initial MCS levels that are lower compared to cell-centre UEs with lower PL.

A base station may estimate that an increase/decrease is required for a grant-free UE based on tracking the average residual block error rate (BLER) over transmissions and retransmissions of all received transport blocks (TBs) from the UE as described above. For example, a physical layer (PHY) abstraction Signal-to-Interference-plus-Noise Ratio to BLER (SINR-to-BLER) mapping may be employed to map combined SINR to residual BLER for each TB. For example, the combined SINR may be calculated at the end of the last retransmission of a TB. A moving average calculation may be employed to update the average residual BLER, e.g. using equation (1).

A base station may compare the average residual BLER (average reliability) to a target BLER (target reliability) of the application/service to which the uplink grant-free session belongs in order to determine if an adjustment to a UE's grant-free uplink MCS level is warranted as described above. For example, a base station may decide that a decrease/increase/no-change MCS command, e.g., {−1, +1, 0} is warranted based on a gap or a ratio between the target BLER and the estimated residual BLERs. A step Δstep, (in terms of MCS level index) may be determined by the base station as well, e.g. using equation (2) above, otherwise a default step may be assumed.

In some embodiments, MCS commands are provided as a code of at least two bits. For example, the closed loop MCS command codes may be configured such that a maximum hamming distance is used between the MCS commands of opposite signs (increase and decrease), e.g., {+2 (11), +1 (01), −1 (10), −2(00)}.

In response to receiving an MCS command, a UE updates its current MCS level based on the received MCS command and the indicated step, if any, e.g., the UE may update its current MCS level according to equation (3) above.

In some embodiments, the UE may also update its open loop (OL) transmit power control (TPC) level based on the received MCS command and the indicated step, if any.

On the network side, the base station may run a closed loop TPC algorithm and generate dynamic closed loop TPC commands for the UE based on the updated DCLLA MCS command. The base station also applies the MCS update command to the current expected MCS level of the UE (similar to the UE's side update to its current MCS level) to determine an updated expected MCS level for the UE. The base station uses updated MCS level for the UE as the expected MCS level assumed for blind detection of transmissions without grant from the UE.

The base station may have detected a current MCS level for the UE from the most recent transmission format used by the UE for an uplink transmission. The base station may also track the sequence of MCS commands transmitted for a UE since an initial MCS to determine an expected MCS level for the UE. The expected MCS levels for UEs can be cross checked against the respective MCS levels that are actually detected at the base station to estimate the reliability of the downlink control channel over which the DCI messages containing the MCS commands are transmitted. Mismatches between the expected and actual MCS levels may indicate that UEs have not received and decoded the MCS commands. In some embodiments, transmit power of the physical indication channel, e.g., PHICH, may be increased (contingent on transmit power limitations) based on detecting MSC mismatches. In some embodiments, the actual MCS level detected by the base station overrides the currently assumed MCS level, according to the previously sent MCS commands to that UE, at the base station to realign the DCLLA procedure.

Figure 4A:
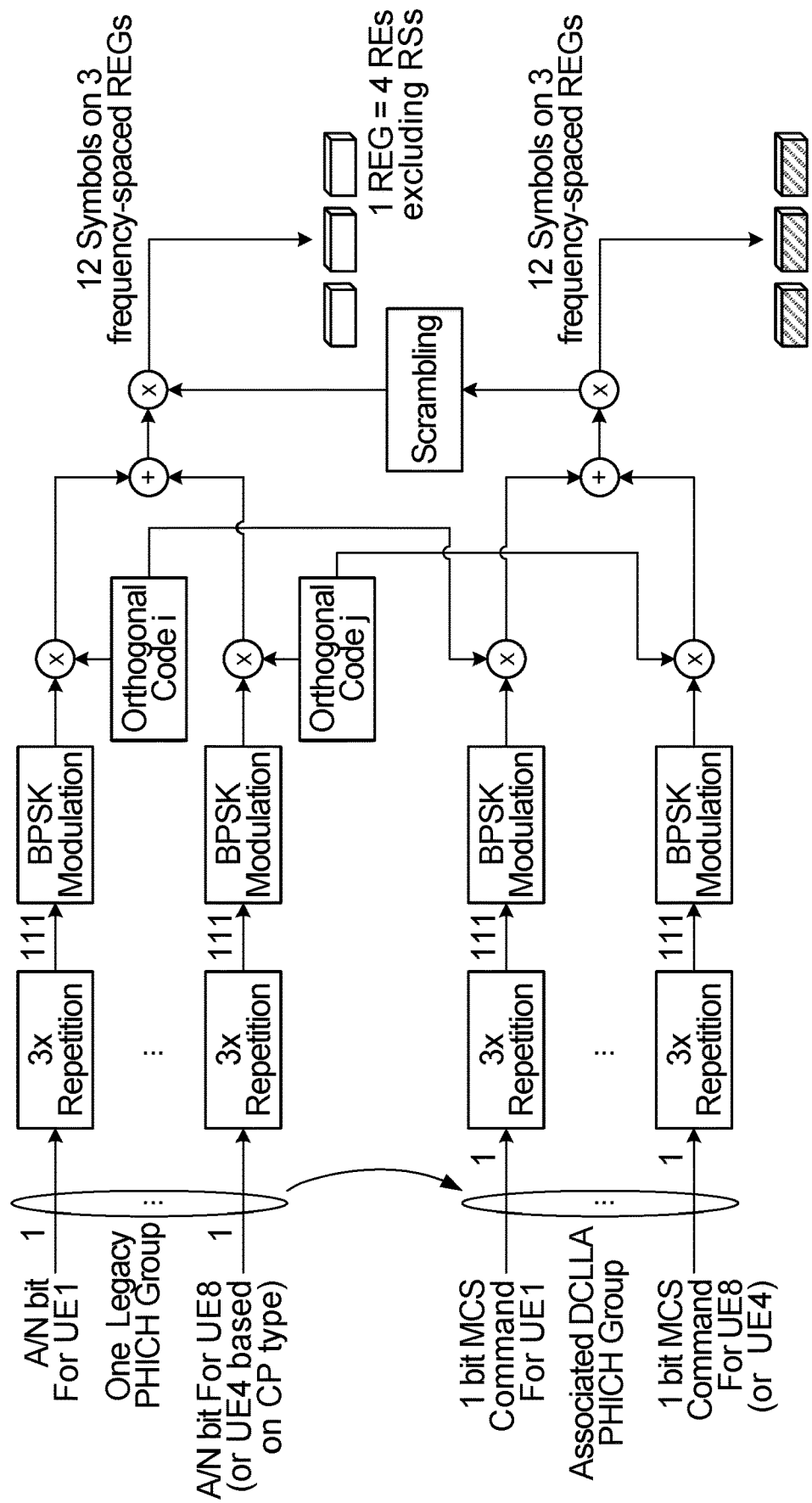
FIGS. 4A-4C show examples of how UE-specific MCS commands may be encoded and mapped to resource groups (REGs) to form an associated dynamic closed loop link adaptation group.
Figure 4B:
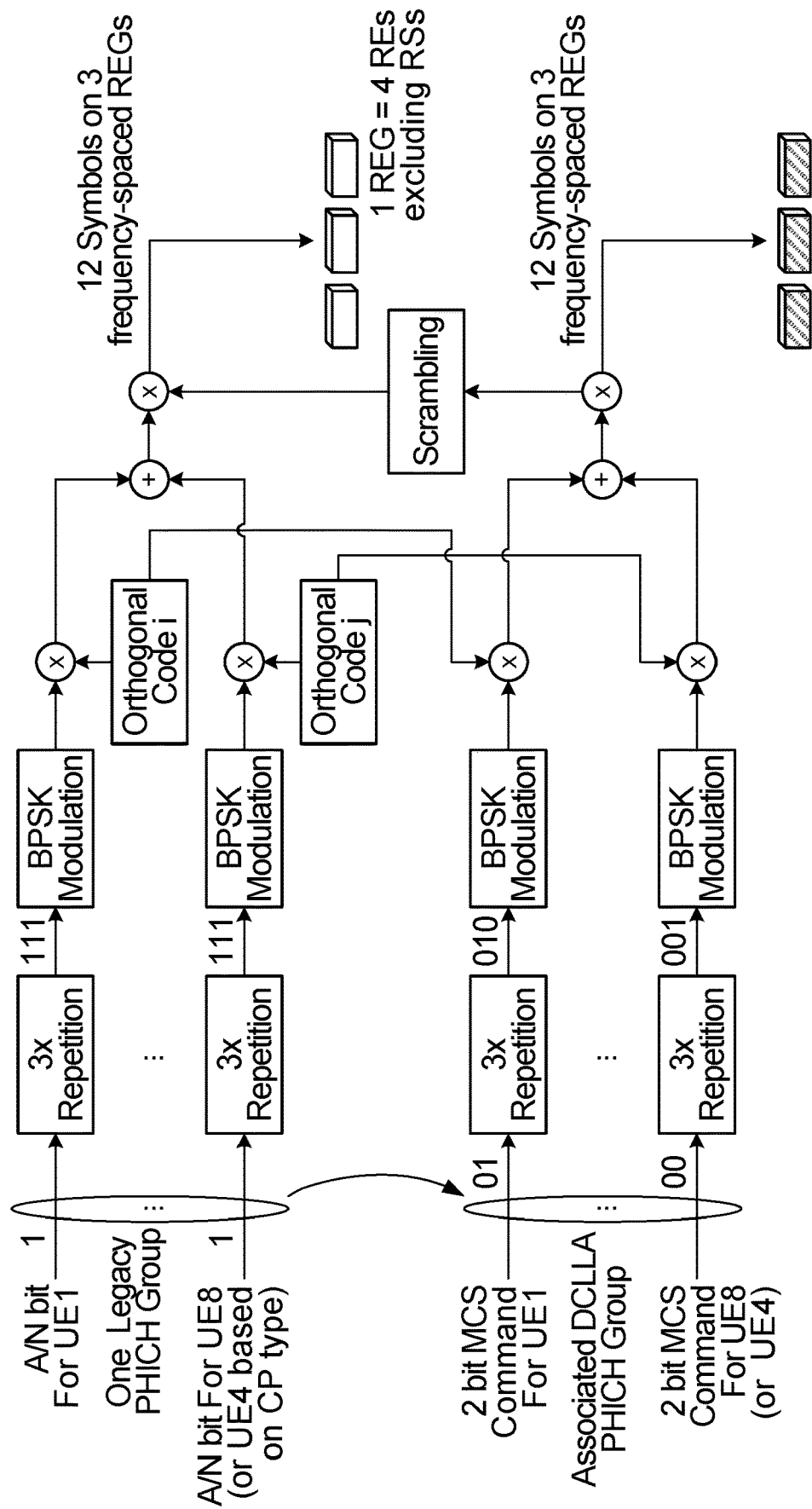
Figure 4C:
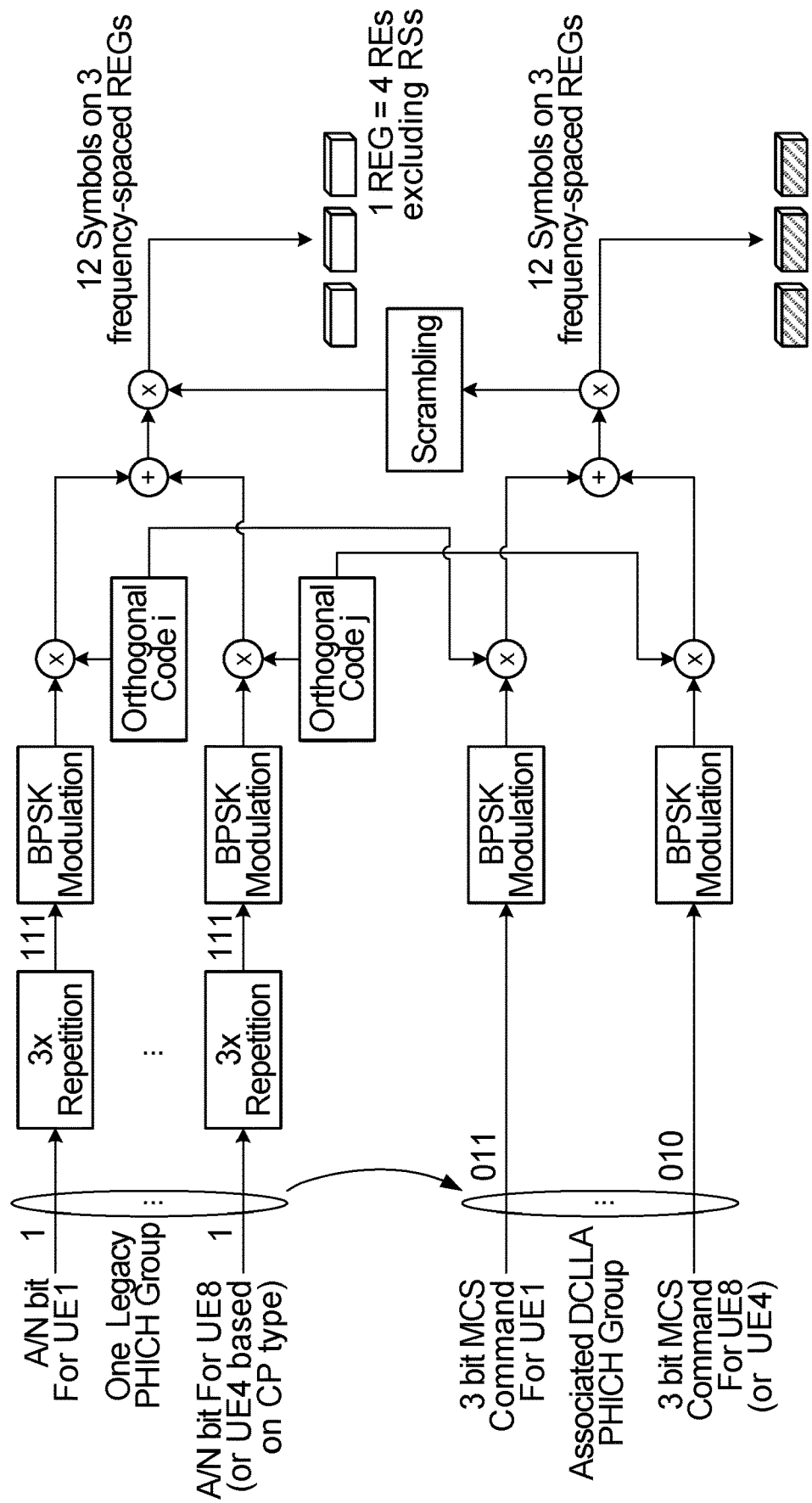

FIGS. 4A-4C show examples of how UE-specific MCS commands may be encoded and mapped to resource groups (REGs) to form an associated DCLLA group in the same or similar manner in which UL HARQ ACK/NACK indication bits are encoded and mapped to REGs to form PHICH groups.

In FIG. 4A, the MCS commands are 1 bit MCS commands, and 3× repetition is used before Binary Phase Shift Keying (BPSK) modulation for increased reliability of the associated DCLLA channel. The repeated and BPSK modulated MCS commands are encoded using orthogonal codes, combined and then scrambled. In the example embodiment shown in FIG. 4A, the resulting scrambled sequence is mapped as 12 symbols on 3 frequency-spaced REGs, where each REG includes 4 resource elements (REs) excluding reference signals (RSs). As shown in FIG. 4A, the same process is used for ACK/NACK bits, which similarly results in 12 symbols on 3 frequency-spaced REGs.

FIG. 4B is similar to FIG. 4A except that in FIG. 4B the MCS commands are 2 bit MCS commands and a parity bit is added rather than using 3× repetition.

FIG. 4C is again similar to FIG. 4A except that in FIG. 4C the MCS commands are 3 bit MCS commands and the 3× repetition is omitted.

It should be noted that a trade-off between MCS command length and additional reliability required can be exploited. For instance, using more bits to encode the MCS commands may imply finer granularity in terms of MCS level updates. In such case, decoding errors of MCS commands may have less impact on grant-free performance and thus less or no additional reliability is required.

For a given bandwidth and system configuration, the number of available legacy PHICH groups for ACK/NACK may be half of those that are conventionally available, with the remainder being used for the new DCLLA groups for MCS commands.

Table 1 below lists different system configurations for total number of PHICH groups at a 15 kHz sub-carrier spacing (SCS) and normal cyclic prefix (NCP) in a Frequency Division Duplexing (FDD) LTE system. This table captures some existing specifications in LTE wherein a given system configuration corresponds to the number of available legacy PHICH groups. The system configuration here is determined by the DL system bandwidth expressed as N_RB and a system parameter N_g. However, it should be understood that this table and the parameters provided therein are provided for illustrative purposes only, and embodiments of the present disclosure are in no way limited to LTE systems.

TABLE 1

| N_RB | N_g | | | |
|---|---|---|---|---|
| | 1/6 | 1/2 | 1 | 2 |
| 6 (1.4 Mhz) | 1 | 1 | 1 | 2 |
| 15 (3 Mhz) | 1 | 1 | 2 | 4 |
| 25 (5 Mhz) | 1 | 2 | 4 | 7 |
| 50 (10 Mhz) | 2 | 4 | 7 | 13 |
| 75 (15 Mhz) | 2 | 5 | 10 | 19 |
| 100 (20 Mhz) | 3 | 7 | 13 | 25 |

Therefore, to accommodate the DCLLA groups within the REGs of the legacy PHICH groups, the following equations can be used to calculate the effective number of PHICH groups in a Frequency Division Duplexing (FDD) system:

$$N_{PHICH}^{group} = \begin{cases} \lceil 0.5 N_g (N_{RB}^{DL}/8) \rceil & \text{for normal cyclic prefix} \\ 2 \cdot \lceil 0.5 N_g (N_{RB}^{DL}/8) \rceil & \text{for extended cyclic prefix} \end{cases}$$

Figure 5:
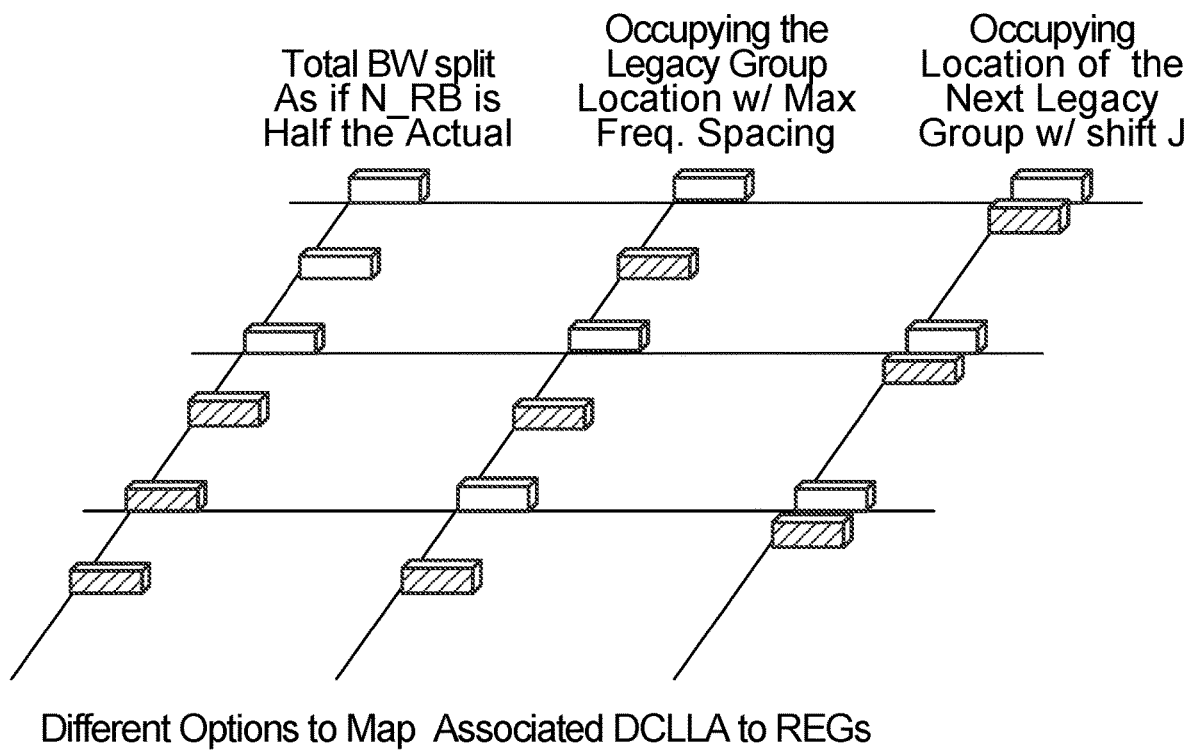
FIG. 5 shows three examples of how dynamic closed loop link adaptation groups may be mapped to resource groups.

Mapping of legacy PHICH groups to REGs may or may not be modified depending on the frequency multiplexing rule of the legacy PHICH groups and the new DCLLA groups. FIG. 5 shows three examples of how the new DCLLA groups may be mapped to legacy PHICH REGs. In the first example shown in FIG. 5, the total bandwidth that is conventionally available for PHICH REGs is split in half and the DCLLA groups and PHICH groups are mapped to the respective halves. In the second example, the DCLLA groups are mapped to legacy PHICH group locations with maximum frequency spacing from their associated PHICH groups to better exploit the frequency diversity. In the third example, the DCLLA groups are mapped so that they occupy the next legacy PHICH group locations with a fixed shift J If the uplink HARQ ACK/NACK design supports multiple simultaneously transmitted TBs in a given subframe, the ACK/NACK codeword (representing multiple TBs) can be appended by the MCS command and the mapping of the DCLLA MCS command symbols to REGs can be based on the transmission parameters (starting RB index and/or DMRS sequence) of the first TB (in the frequency domain) as well as the frequency multiplexing rule used to multiplex the PHICH REGs and the DCLLA REGs.

As noted above, the UE uses the same parameters (starting RB index and/or DMRS sequence) that it uses to locate its PHICH and extract the ACK/NACK message to locate the associated DCLLA group and extract the MCS command. For example, to locate the associated DCLLA group, the UE may locate its PHICH and then apply an appropriate shift of group index based on the frequency multiplexing rule used to multiplex the DCLLA and PHICH groups.

Pre-Configured Retransmissions in More Reliable Grant-Free Sub-Regions

As noted above, a second aspect of the present disclosure provides uplink transmission without grant using pre-configured resource groups that map initial transmissions without grant and retransmissions without grant to sub-regions of a grant-free time-frequency resource region/space such that the retransmissions are mapped to more reliable sub-regions.

According to this aspect of the present disclosure, a UE can be pre-configured to start its initial transmissions without grant with a relatively ambitious MCS level so that initial transmissions require minimal resources. The initial MCS level MCS may be determined based on UE's geometry or PL, for example. Retransmissions are pre-configured to use lower MCS levels to increase the likelihood of decoding success.

In some embodiments, different grant-free UEs may be pre-configured/reconfigured, e.g., through a group common DCI or through higher-layer signalling such as RRC, with different maximum number of repetitions, K>=1, per TB. The maximum number of repetitions, K, could be determined in a way taking into account the UE's geometry or path loss from the serving base station. For instance, K could be determined such that a cell-edge UE uses a larger number of repetitions than that used by a middle-cell UE whereas a middle-cell UE uses a larger number of repetitions than that used by a cell-centre UE. Also, K may be application/session-specific. In such cases, applying the MCS levels of the preconfigured resource group in use to a grant-free repetition is effectively a grant-free 'retransmission' of the TB using a new transport format and the term 'retransmission' can thus be interpreted as 'repetition' where applicable hereafter.

The size of the pre-configured resource groups may be equal to or greater than K in the latter embodiments.

In some embodiments, a smaller maximum number of retransmissions may be configured compared to fixed MCS grant-free uplink procedures.

Retransmissions may gradually utilize more resources. The retransmissions may continue until termination in response to receiving an ACK or a DCI signaling or until a pre-configured maximum number of retransmissions is reached.

Given the same TB size over retransmissions, lowering MCS levels, and thus increased reliability, can be achieved by increasing the amount of resources used in time, frequency or both for retransmissions.

FIGS. 6 to 11 show examples of how a grant-free region/resource space can be divided into sub-regions and initial transmissions and retransmissions can be mapped to resources within the sub-regions in pre-configured resource groups so that retransmissions are mapped to more reliable sub-regions. It should be noted that these sub-regions can be logical sub-regions and may not be contiguous in physical resources.

Figure 6:
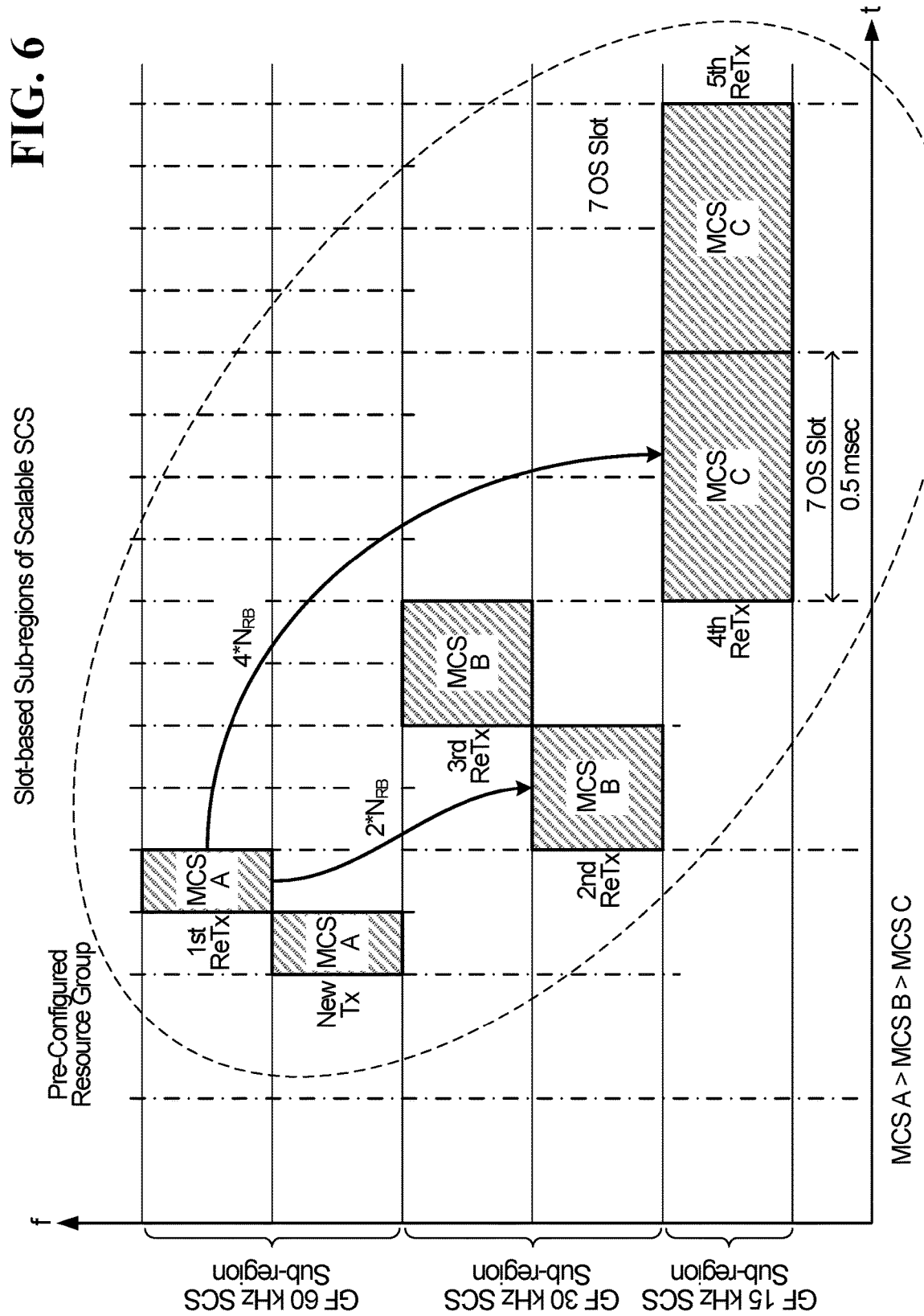
FIGS. 6 to 11 show examples of how a grant-free region/resource space can be divided into sub-regions and initial transmissions and retransmissions can be mapped to resources within the sub-regions in pre-configured resource groups so that retransmission are mapped to more reliable sub-regions.

FIG. 6 shows an example of a grant-free region divided into slot-based sub-regions with scalable sub-carrier spacings (SCSs). In particular, in the example shown in FIG. 6 the grant-free region has been divided into a first grant-free sub-region with a 15 kHz SCS, a second grant-free sub-region with a 30 kHz SCS, and a third grant-free sub-region with a 60 kHz SCS. A pre-configured resource group is defined that maps a new uplink grant-free transmission to a slot in the first grant-free sub-region with the 60 kHz SCS. A first retransmission is mapped to a subsequent slot in the first grant-free sub-region. The new uplink transmission without grant and the first retransmission are transmitted with a first MCS level MCS A. Second and third retransmissions are mapped to slots in the second grant-free sub-region with a 30 kHz SCS and are transmitted with a second MCS level MCS B, where MCS A>MCS B. Each retransmission in the second grant-free sub-region occupies twice the number of resource blocks (RBs) of the transmission/retransmission in the first grant-free sub-region over the same bandwidth due to the narrower SCS of the second grant-free sub-region. Fourth and fifth retransmissions are mapped to slots in the third grant-free sub-region with a 15 kHz SCS and are transmitted with a third MCS level MCS C, where MCS A>MCS B>MCS C. Each retransmission in the third grant-free sub-region occupies four times the number of RBs of the new transmission in the first grant-free sub-region due to the narrower SCS of the third grant-free sub-region.

Figure 7:
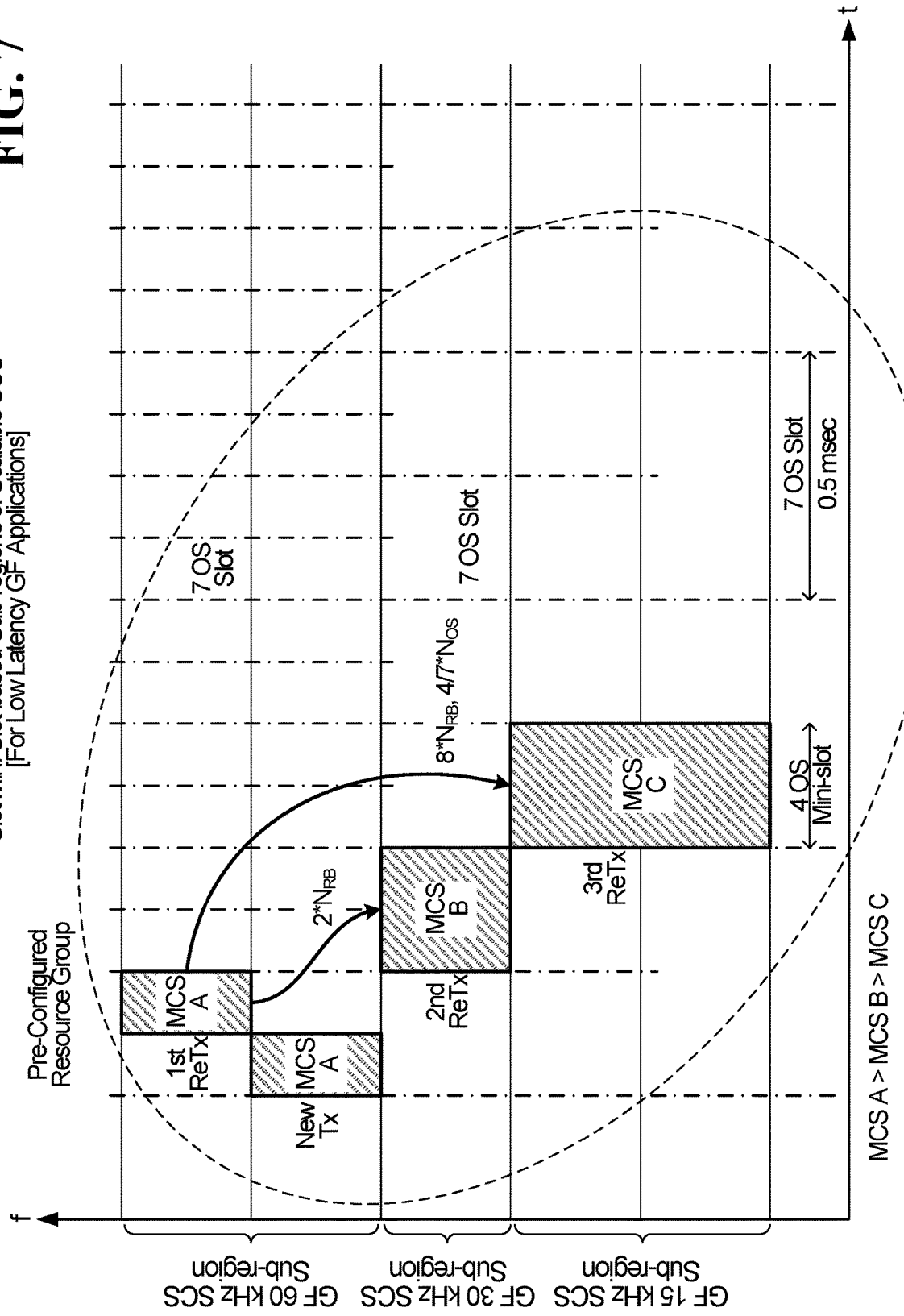

FIG. 7 shows an example of a grant-free region divided into slot/mini-slot based sub-regions with scalable SCSs. The use of mini-slot based sub-regions may be advantageous for low latency grant-free applications. Similar to FIG. 6, in FIG. 7 the grant-free region is divided into first, second and third sub-regions having 60 kHz, 30 kHz and 15 kHz SCSs, respectively, and the first and second grant-free sub-regions are slot-based. However, in FIG. 7, the third grant-free sub-region with the 15 kHz SCS is mini-slot, with a mini-slot length of only four OFDM symbols (OSs), rather than the seven OFDM symbol intervals of a full slot, and the bandwidth of the retransmission that is mapped to the mini-slot in the third grant-free sub-region is double the bandwidth of retransmissions in the first and second grant-free sub-regions. Similar to FIG. 6, in FIG. 7 the initial grant-free transmission and the first retransmission that are mapped to slots in the first grant-free sub-region are transmitted with a first MCS level MCS A and the second retransmission that is mapped a slot in the second grant-free sub-region is transmitted with a second MCS level MCS B, where MCS A>MCS B. However, in FIG. 7, the third retransmission is mapped to a mini-slot in the third grant-free sub-region and is transmitted with a third MCS level MCS C, where MCS A>MCS B>MCS C. In this configuration the second retransmission that is mapped to the second grant-free sub-region occupies twice the number of RBs of the first retransmission that is mapped to a slot in the first grant-free sub-region due to the narrower SCS of the second grant-free sub-region. Due to the doubled bandwidth of the third grant-free sub-region, its narrower SCS, and the use of a 4 OS mini-slot rather than a full 7 OS slot in the third grant-free sub-region, the third retransmission that is mapped to the third grant-free sub-region occupies eight times the number of RBs of the first transmission that is mapped to a slot in the first grant-free sub-region, but it is transmitted over only 4/7 of the first transmission's OSs.

Figure 8:
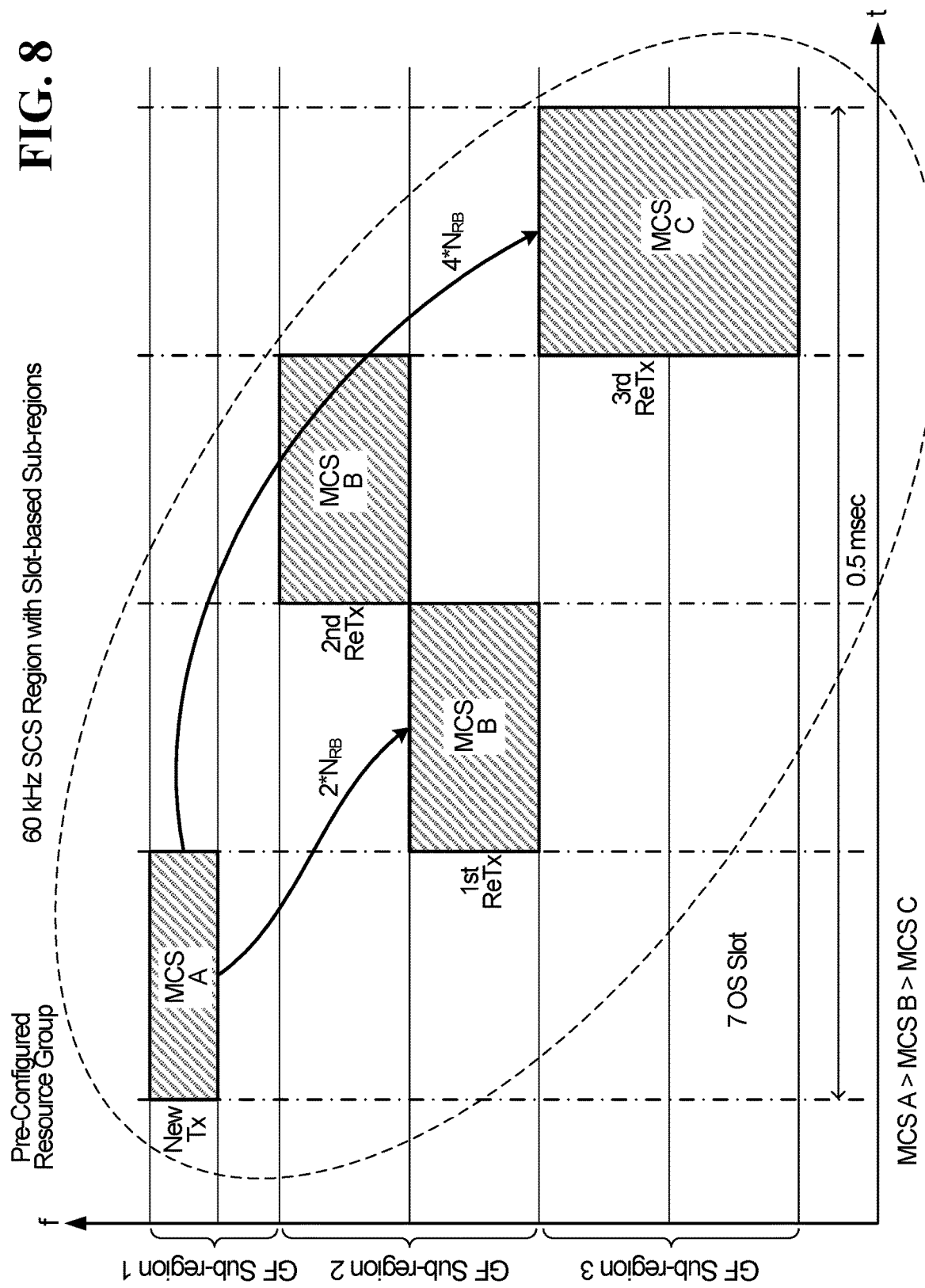

FIG. 8 shows an example of a grant-free region divided into slot based sub-regions that each have the same 60 kHz SCS. Similar to FIG. 6, in FIG. 8 the grant-free region is divided into first, second and third slot-based sub-regions. However, in FIG. 8 each of the three grant-free sub-regions has the same 60 kHz SCS. A pre-configured resource group is defined that maps a new uplink grant-free transmission to a slot in the first grant-free sub-region. The new uplink grant-free transmission and the first retransmission are transmitted with a first MCS level MCS A. First and second retransmissions are mapped to slots in the second grant-free sub-region and are transmitted with a second MCS level MCS B, where MCS A>MCS B. The first and second retransmissions in the second grant-free sub-region each occupy twice the number of RBs of the initial transmission in the first grant-free sub-region because the retransmissions in the second grant-free sub-region occupy twice the bandwidth of initial transmission. A third retransmission is mapped to a slot in the third grant-free sub-region and is transmitted with a third MCS level MCS C, where MCS A>MCS B>MCS C. The third retransmission in the third grant-free sub-region occupies twice the number of RBs of each retransmission in the second grant-free sub-region, i.e. four times the number of RBs of the initial transmission in the first grant-free sub-region, because the retransmission in the third grant-free sub-region occupies twice the bandwidth of the retransmissions in the second grant-free sub-region.

Figure 9:
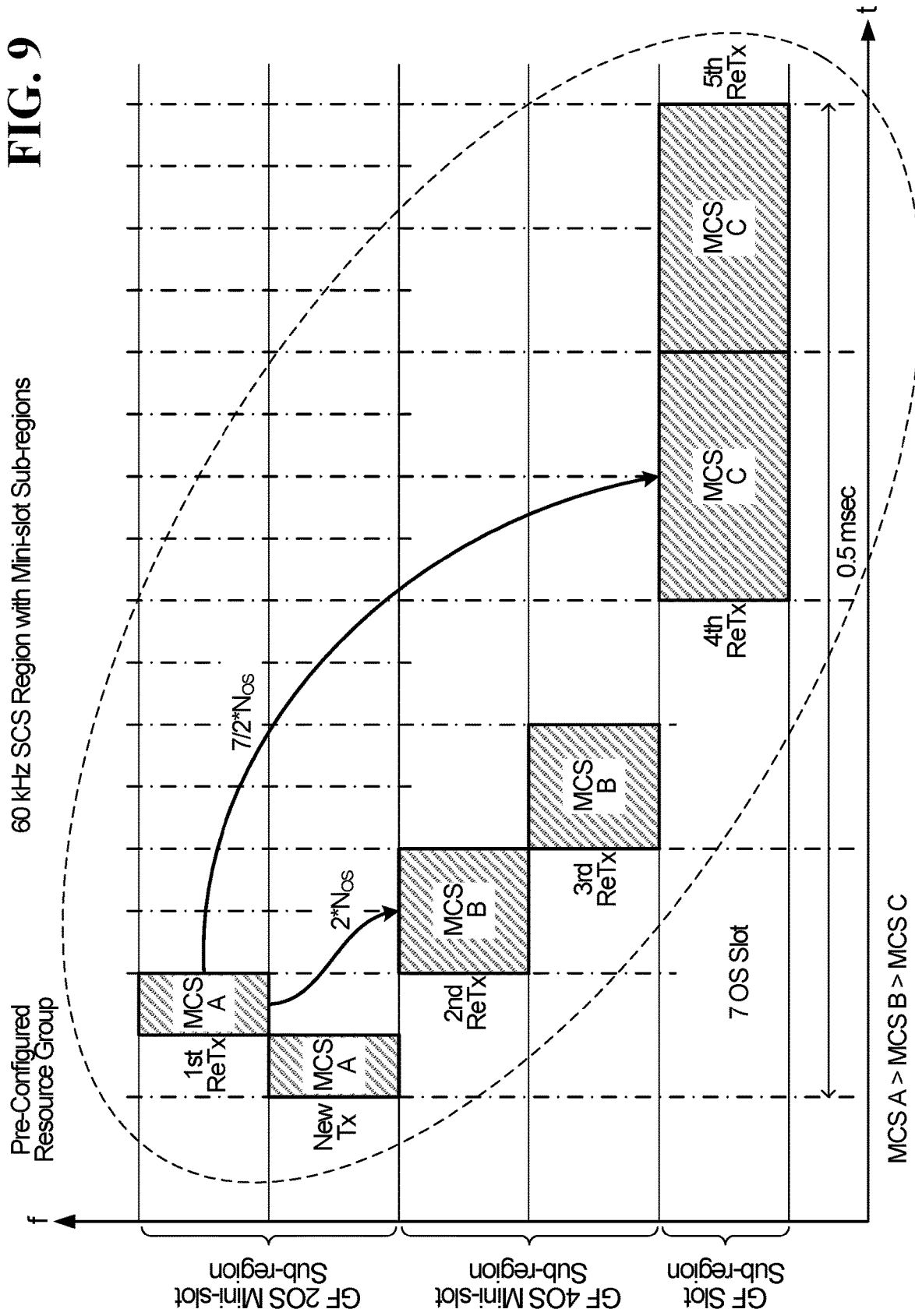

FIG. 9 shows an example of a grant-free region divided into a combination of mini-slot and slot based sub-regions that each have the same 60 kHz SCS. In this embodiment, the grant-free region is divided into a first grant-free sub-region that is mini-slot based with a mini-slot length of two OSs, a second grant-free sub-region that is mini-slot based with a mini-slot length of four OSs, and a third grant-free sub-region that is slot-based having a seven OS slot length. A pre-configured resource group is defined that maps a new uplink grant-free transmission to a mini-slot in the first grant-free sub-region. A first retransmission is mapped to a subsequent mini-slot in the first grant-free sub-region. The new uplink grant-free transmission and the first retransmission are transmitted with a first MCS level MCS A. Second and third retransmissions are mapped to mini-slots in the second grant-free sub-region and are transmitted with a second MCS level MCS B, where MCS A>MCS B. Each retransmission in the second grant-free sub-region occupies twice the number of OSs of the transmission/retransmission in the first grant-free sub-region due to the use of a 4 OS mini-slot in the second grant-free sub-region compared to a 2 OS mini-slot in the first grant-free sub-region. Fourth and fifth retransmissions are mapped to slots in the third grant-free sub-region and are transmitted with a third MCS level MCS C, where MCS A>MCS B>MCS C. Each retransmission in the third grant-free sub-region occupies 3.5 times the number of OSs of the transmissions in the first grant-free sub-region due to the use of 7 OS slots in the third grant-free sub-region compared to the 2 OS mini-slot in the first grant-free sub-region.

Figure 10:
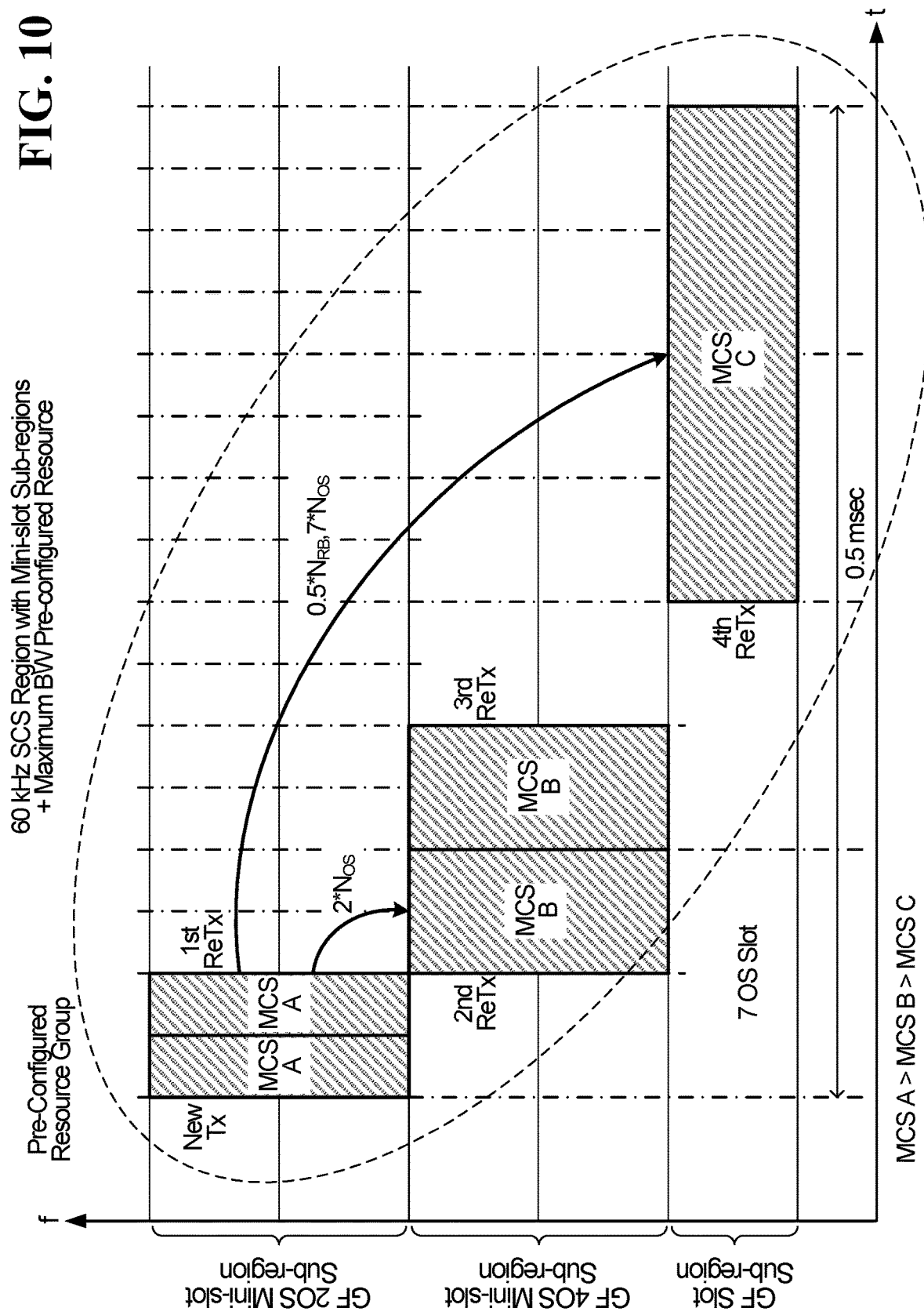

FIG. 10 shows another example of a grant-free region divided into a combination of mini-slot and slot based sub-regions that each have the same 60 kHz SCS. However, unlike the example shown in FIG. 9, in the example shown in FIG. 10 the maximum bandwidths of the first and second mini-slot based grant-free sub-regions are used for transmission/retransmission in the first and second mini-slot based grant-free sub-regions, and only half the maximum bandwidth of the third slot based grant-free sub-region is used for retransmission in the third grant-free sub-region. However, the retransmission in the third grant-free sub-region spans 14 OSs (i.e., two 7 OS slots). The pre-configured resource group depicted in FIG. 10 maps a new uplink grant-free transmission to a 2 OS mini-slot in the first grant-free sub-region. A first retransmission is mapped to a subsequent 2 OS mini-slot in the first grant-free sub-region. The new uplink transmission without grant and the first retransmission are transmitted with a first MCS level MCS A. Second and third retransmissions are mapped to 4 OS mini-slots in the second grant-free sub-region and are transmitted with a second MCS level MCS B, where MCS A>MCS B. Each retransmission in the second grant-free sub-region occupies twice the number of OSs of the transmission/retransmission in the first grant-free sub-region over the same bandwidth due to the use of a 4 OS mini-slot in the second grant-free sub-region compared to a 2 OS mini-slot in the first grant-free sub-region. A fourth retransmission is mapped to two 7 OS slots in the third grant-free sub-region. The fourth retransmission is transmitted with a third MCS level MCS C, where MCS A>MCS B>MCS C. The fourth retransmission in the third grant-free sub-region occupies half the number of RBs in the frequency dimension and seven times the number of OSs in the time dimension compared to the transmissions in the first grant-free sub-region due to the use of half the maximum bandwidth over two slots for the fourth retransmission in the third grant-free sub-region compared to the use of the full maximum bandwidth over only a 2 OS mini-slot for each of the transmissions in the first grant-free sub-region.

Figure 11:
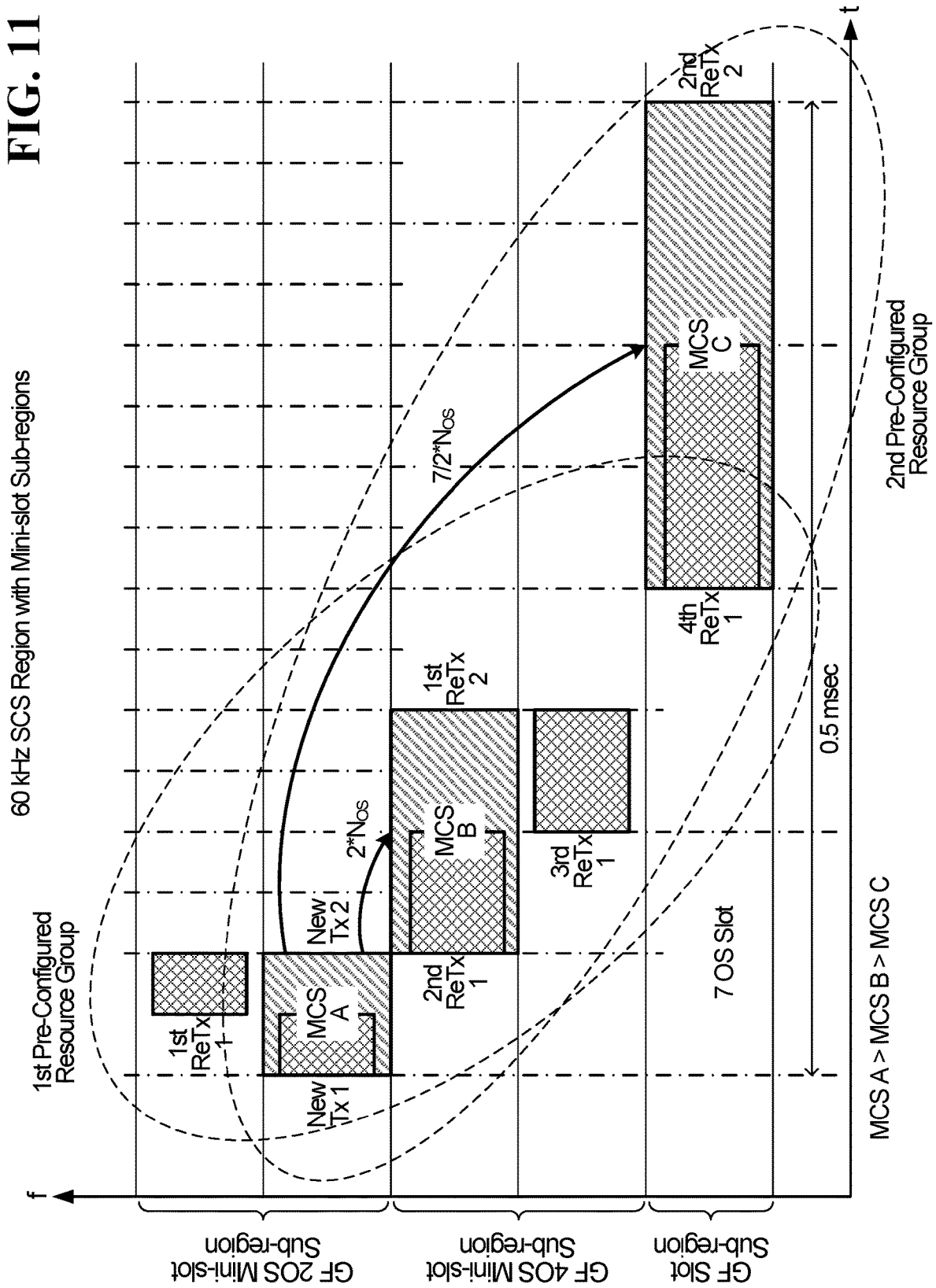

FIG. 11 shows another example of a grant-free region divided into a combination of mini-slot and slot based sub-regions that each have the same 60 kHz SCS. FIG. 11 illustrates an example of how transmission time interval (TTI) bundling may be employed in embodiments of the present disclosure. In the example shown in FIG. 11 the grant-free region is divided into first, second and third grant-free sub-regions each having a 60 kHz SCS. FIG. 11 shows two pre-configured resource groups as options for use by the same UE. This is an example of pre-configuration of grant-free UE with multiple resource groups featuring different amounts of resources to accommodate different TB sizes and/or latency/bandwidth requirements.

A first pre-configured resource group maps a new uplink grant-free transmission (New Tx 1) and a first retransmission ($1^{st}$ ReTx 1) on a first and a second bandwidth, respectively, using one 2 OS mini-slot each in the first grant-free sub-region. The new uplink grant-free transmission (New Tx 1) and the first retransmission ($1^{st}$ ReTx 1) are transmitted with a first MCS level MCS A. The first pre-configured resource group also maps a second retransmission ($2^{nd}$ ReTx 1) and a third retransmission ($3^{rd}$ ReTx 1) on third and fourth bandwidths using one 4 OS mini-slot each in the second grant-free sub-region. The second retransmission ($2^{nd}$ ReTx 1) and the third retransmissions ($3^{rd}$ ReTx 1) are transmitted with a second MCS level MCS B, where MCS A>MCS B. The second retransmission ($2^{nd}$ ReTx 1) in the second grant-free sub-region occupies twice the number of OSs of the new transmission (New Tx 1) in the first grant-free sub-region over the same bandwidth due to the use of a 4 OS mini-slot in the second grant-free sub-region compared to a 2 OS mini-slot in the first grant-free sub-region. The first pre-configured resource group also maps a fourth retransmission ($4^{th}$ ReTx 1) to one 7 OS slot in the third grant-free sub-region. The fourth retransmission ($4^{th}$ ReTx 1) is transmitted with a third MCS level MCS C, where MCS A>MCS B>MCS C. The fourth retransmission ($4^{th}$ ReTx 1) in the third grant-free sub-region occupies 3.5 times the number of OSs in the time dimension compared to the new transmission (New Tx 1) in the first grant-free sub-region due to the use of one 7 OS slot for the fourth retransmission ($4^{th}$ ReTx 1) in the third grant-free sub-region compared to the use of a 2 OS mini-slot for the first transmission (New Tx 1) in the first grant-free sub-region.

A second pre-configured resource group maps a new uplink grant-free transmission (New Tx 2) on the second bandwidth on two 2 OS mini-slots in the first grant-free sub-region, i.e., there is TTI bundling of the new transmission across the two 2 OS mini-slots in the first grant-free sub-region. The new uplink grant-free transmission (New Tx 2) is transmitted with a first MCS level MCS A. The second pre-configured resource group also maps a first retransmission ($1^{st}$ ReTx 2) on the third bandwidth on two 4 OS mini-slots in the second grant-free sub-region, i.e., there is TTI bundling of the first retransmission ($1^{st}$ ReTx 2) across the two 4 OS mini-slots in the second grant-free sub-region. The first retransmission is transmitted with a second MCS level MCS B, where MCS A>MCS B. The first retransmission ($1^{st}$ ReTx 2) in the second grant-free sub-region occupies twice the number of OSs of the new transmission (New Tx 2) in the first grant-free sub-region over the same bandwidth due to the use of two bundled 4 OS mini-slots in the second grant-free sub-region compared to two bundled 2 OS mini-slots in the first grant-free sub-region. The second pre-configured resource group also maps a second retransmission ($2^{nd}$ ReTx 2) to two 7 OS slots in the third grant-free sub-region. The second retransmission ($2^{nd}$ ReTx 2) is transmitted with a third MCS level MCS C, where MCS A>MCS B>MCS C. The second retransmission ($2^{nd}$ ReTx 2) in the third grant-free sub-region occupies 3.5 times the number of OSs in the time dimension compared to the first transmission (New Tx 2) in the first grant-free sub-region due to the use of a two full 7 OS slots for the second retransmission ($2^{nd}$ ReTx 2) in the third grant-free sub-region compared to the use of two 2 OS mini-slots for the first transmission (New Tx 2) in the first grant-free sub-region.

As will be described in further detail later on, a base station detecting that a UE has transmitted a grant-free uplink transmission and/or retransmission in accordance with the second pre-configured resource group or at least in violation of the first pre-configured resource group when the first pre-configured resource group was expected, or vice versa, may signal the UE to use the detected pre-configured resource group.

By mapping the initial transmission and subsequent retransmissions across grant-free sub-regions as shown in the examples depicted in FIGS. 6 to 11, it should be appreciated that the retransmissions in these examples are pre-configured to use gradually decreasing MCS levels to increase the likelihood of decoding success. For example, the MCS level is decreased from MCS A to MCS B for retransmissions in the second grant-free sub-region, and is again decreased from MCS B to MCS C for retransmissions in the third grant-free sub-region.

It should be understood that although FIGS. 6 to 11 show examples of how a grant-free region may be divided into three sub-regions, in other embodiments a grant-free region may be divided into two, four or even more sub-regions.

It should also be appreciated that although the pre-configured resource groups shown in FIGS. 6 to 11 each define resources for a new transmission and multiple retransmissions, in practice one or more of the retransmissions may not be made if the retransmissions are terminated in response to receiving an ACK or a DCI signaling, for example.

As demonstrated in the examples depicted in FIGS. 6 to 11, the definition of sub-regions simplifies the coexistence of pre-configured grant-free transmissions/retransmissions using different numerologies so that retransmissions can be done using numerologies that provide increasingly more reliable, i.e. lower, MCSs to increase the likelihood of successful detection.

It should be also noted that, from the network perspective, the definition of multiple sub-regions of different numerologies simplifies the uplink coexistence of multiple UEs configured to use a certain numerology, such as SCS and/or mini-slot size, by mapping their transmissions/retransmissions to the respective sub-regions.

Starting sub-region for a grant-free UE may be chosen based on the link budget of the grant-free UE. Cell-edge UEs can start the adaptive transmissions at a sub-region of low MCS compared to cell-centre UEs, for example.

In some embodiments, a default pre-configured resource group is defined. A UE assumes the default pre-configured resource group configuration is to be used unless a higher layer signal, e.g., RRC, indicates a revised/non-default pre-configured resource group configuration is to be used.

Multiple resource groups can be pre-configured in addition to the default one. Each pre-configured resource group may be associated with a group index, which allows a base station to signal a revised group index to instruct a UE to use the pre-configured resource group configuration associated with the revised group index.

A base station may signal a revision of the pre-configured resource group in use to the UE based on UE mobility or change in channel conditions and target latency and/or reliability.

A base station may also or instead signal a revision of the pre-configured resource group in use to the UE based on detecting a TB size in a new grant-free uplink transmission that is larger or smaller than the default TB size. For example, a base station may signal a revision of the pre-configured resource group to a UE in response to detecting that the UE used the expected pre-configured MCS for a new grant-free uplink transmission but bundled slots/mini-slots to accommodate a larger TB size to fit a larger packet size or a Radio Link Control (RLC) concatenation of multiple queued packets.

In another scenario, a base station may signal a revision of the pre-configured resource group to a UE in response to detecting that the UE used the expected pre-configured MCS for a new grant-free uplink transmission but with padded data over the pre-configured resource in use, or detecting that the grant-free uplink transmission on the physical uplink shared channel (PUSCH) occupied less resources than pre-configured in use, either of which would indicate a smaller packet size than the default TB size.

It should be noted that the foregoing provides a mechanism by which a UE is able to signal to a base station that a change to a different pre-configured resource group is required. In particular, a UE can signal that a change is required by transmitting a TB size in a new grant-free uplink transmission that is larger or smaller than the default TB size of the pre-configured resource group currently in use by the UE.

The base station may signal the revision of the pre-configured resource group to a UE within a UE-specific DCI message or on a group common DCI, for example.

In response to receiving the revision signaling, the UE switches to the signaled pre-configured resource group to continue with further retransmissions/repetitions. In some embodiments, the UE continues to use the revised pre-configured resource group for grant-free uplink transmission of other TBs until signaled to fall back to the default group or another pre-configured resource group. In some embodiments, a UE may continue to use the revised pre-configured resource group for grant-free uplink transmission of other TBs for a given interval then falls back to the default group. The interval may be indicated in the signaling that provides the revision of the resource group configuration or it may be a pre-configured parameter. In some embodiments, a UE may also or instead fall back to a default pre-configured resource group configuration after a base station indicates successful decoding of a TB, the maximum number of retransmissions/repetitions has been exhausted, or corresponding packets have been dropped for expiry.

DCLLA for Pre-Configured Retransmissions

A third aspect of the present disclosure combines features of the first two aspects to provide a hybrid grant-free link adaptation design. For example, an embodiment according to the third aspect of the present disclosure provides a grant-free link adaptation design in which UEs use pre-configured resource groups for transmission/retransmission(s) in accordance with the second mechanism described above based on criteria such as their long-term path loss, expected collision levels, and/or TB sizes of the application. Meanwhile, the UEs receive fine tuning DCLLA MCS commands over any of the previously described channels to cope with short-term channel variations and mobility in accordance with the first mechanism described above. Such fine tuning may involve, for example, changing one or more of the MCS level(s) used for retransmissions within a pre-configured resource group currently in use by the UE. For example, in some embodiment, a received DCLLA MCS command may be applied to all MCS levels associated with a pre-configured resource group currently in use. In other embodiments, a received DCLLA MCS command may be applied to only one or a subset of the MCS levels associated with the pre-configured resource group currently in use. For example, in some embodiments, a received DCLLA MCS command is applied only to the MCS level used for an initial grant-free transmission. In other embodiments, a received DCLLA MCS command is applied to all transmissions, including an initial transmission and any re-transmission(s) without grant, within one sub-region. In other embodiments, a received DCLLA MCS command is applied only to the MCS levels used for retransmissions or a subset of the MCS levels used for retransmissions.

Grant-free UEs are mapped to specific regions for UL transmission without grant. In some embodiments, a grant-free UE is configured to use different regions for an initial transmission compared to associated retransmissions. For example, referring again to FIGS. 6 to 11, a UE that makes an initial transmission in a first sub-region may be configured to make retransmission(s) in different sub-regions. This allows for increased diversity between the initial transmission and the retransmission(s). This can also be used to avoid resource overlap for multiple grant-free UEs for both initial transmissions and retransmissions. Due to a limited number of regions, or a small bandwidth, a unique grouping for successive transmissions may not always be possible. In some embodiments, grant-free UEs are configured to perform resource/region hopping to lower the chances of collision. By definition, a different region is used for each of an initial transmissions and retransmissions, since different TTIs, and hence different times are used. With hopping, some other aspect of the numerology is also different as between the initial transmission and the retransmission. In other words, the MCS, pilot, frequency combination used for the initial transmission is different than that used for the retransmission(s). More specifically, in addition to using different regions for an initial transmission and a retransmission, a UE may use different MCSs for the transmissions. The mapping of UEs to a region may be semi-static based on long term adaptation.

Figure 12:
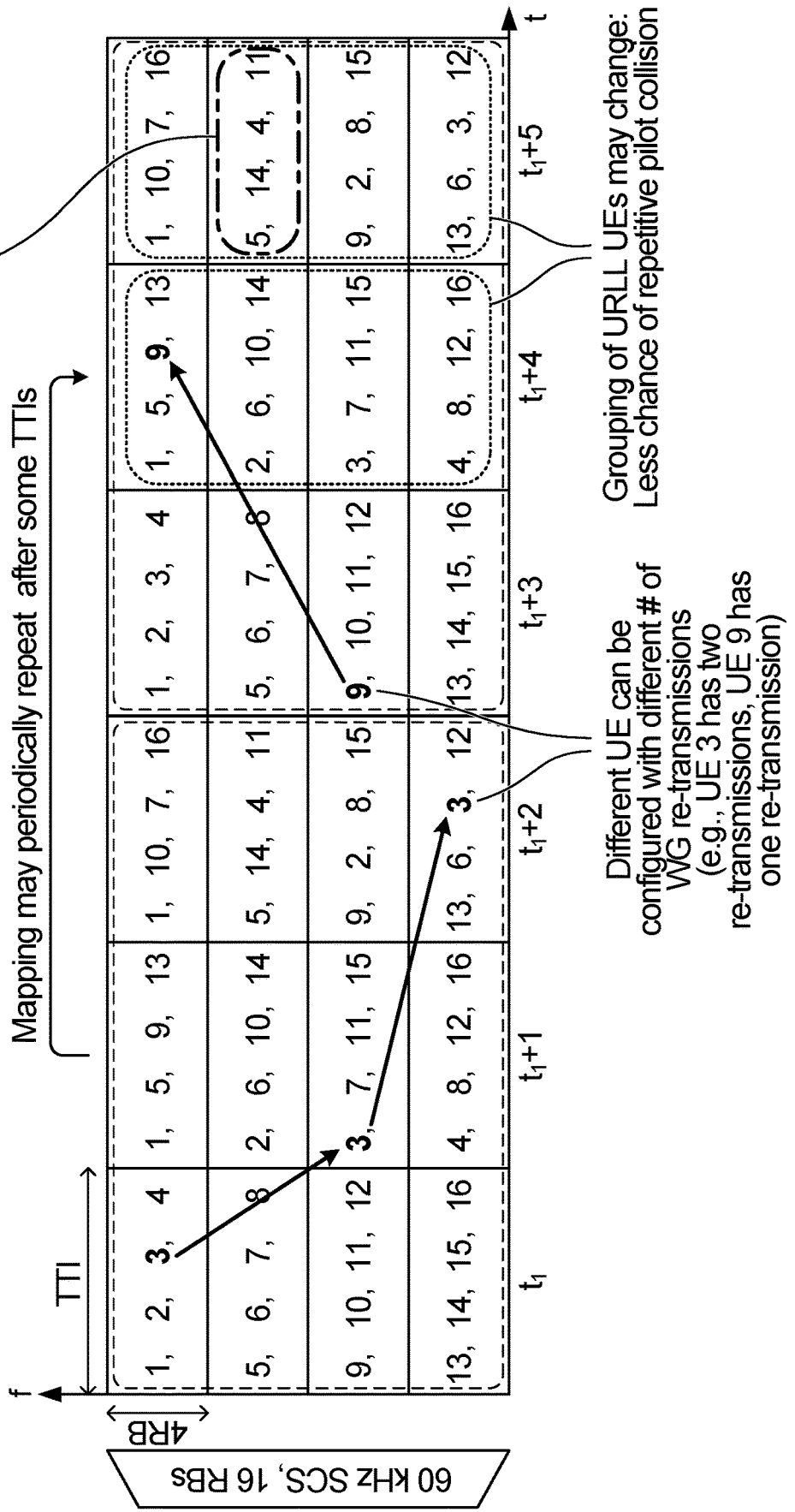
FIG. 12 shows an example in which a grant-free partition is divided into four segments within each of six TTIs.

FIG. 12 shows an example in which a grant-free partition is divided into four segments within each of six TTIs. In the illustrated example, during TTI $t_1$, this segmentation defines four regions. Each region includes 4 RBs and supports up to four UEs in this example. A list of four numbers depicted for each region represents a set of four UEs mapped to that region. A UE being mapped to a given set of regions will make transmissions without grant using the regions to which it is mapped in a given TTI if it has data to send. However, the UE may or may not have a transmission to make in a given region to which it is mapped. In the illustrated example, during TTI $t_1$, UEs 1, 2, 3, 4 are mapped to a first region; UEs 5, 6, 7, 8 are mapped to a second region; UEs 9, 10, 11, 12 are mapped to a third region; and UEs 13, 14, 15, 16 are mapped to a fourth region. From one TTI to the next, the mapping changes. Thus, during TTI $t_1+1$, UEs 1, 5, 9, 13 are mapped to a first region; UEs 2, 6, 10, 14 are mapped to a second region; UEs 3, 7, 11, 15 are mapped to a third region; and UEs 4, 8, 12, 16 are mapped to a fourth region. Similarly, during TTI $t_1+2$, UEs 1, 10, 7, 16 are mapped to a first region; UEs 5, 14, 4, 11 are mapped to a second region; UEs 9, 2, 8, 15 are mapped to a third region; and UEs 13, 6, 3, 12 are mapped to a fourth region. Note that the entire pattern repeats for TTUs $t_1+3$, $t_1+4$ and $t_1+5$. Different UEs can be configured with a different number of retransmissions without grant (e.g., in this example it is assumed that UE 3 has two retransmissions and UE 9 has one retransmission). In this example, it can be seen that the mapping is such that there are no other UEs that are in common between any two regions in which a UE is mapped. Thus, in this particular example, the probability of collision between the same group of UEs in both the initial transmission and retransmission(s) is reduced compared to a situation where the group of UEs use the same resources for initial transmissions and retransmissions.

In the example of FIG. 12, each region supports four codebook layers, and there are four UEs mapped to be able to transmit on those layers, assuming each UE transmits on one layer. More generally, there may be a larger, in some cases much larger, number of UEs mapped to a given region than there are layers. For example, the first region for TTI $t_1$ may have six layers, and may have 36 UEs mapped to that region. In that case, some different UE's traffic can be separated by using different codebook and/or pilot sequence. However, it may still be the case that there are more UEs mapped to a region than there are unique combinations of layers, pilot sequences and codebooks. In this case, there is the potential for collision if multiple UEs that are transmitting on the identical resource transmit at the same time. In some embodiments, UEs are configured to employ hopping to lower the chances of collision with the same UE during both an initial transmission and a retransmission.

For example, referring again to FIG. 12, the first region for transmission for UE 3 during TTI $t_1$ is in a different frequency segment than the region for transmission for UE 3 during TTI $t_1+1$. The MCS level may also be changed as between the initial transmission and the retransmission for more robustness/reliability, as described previously. This reduces the likelihood that UE 32 and another UE have colliding transmissions during both TTIs.

Figure 13:
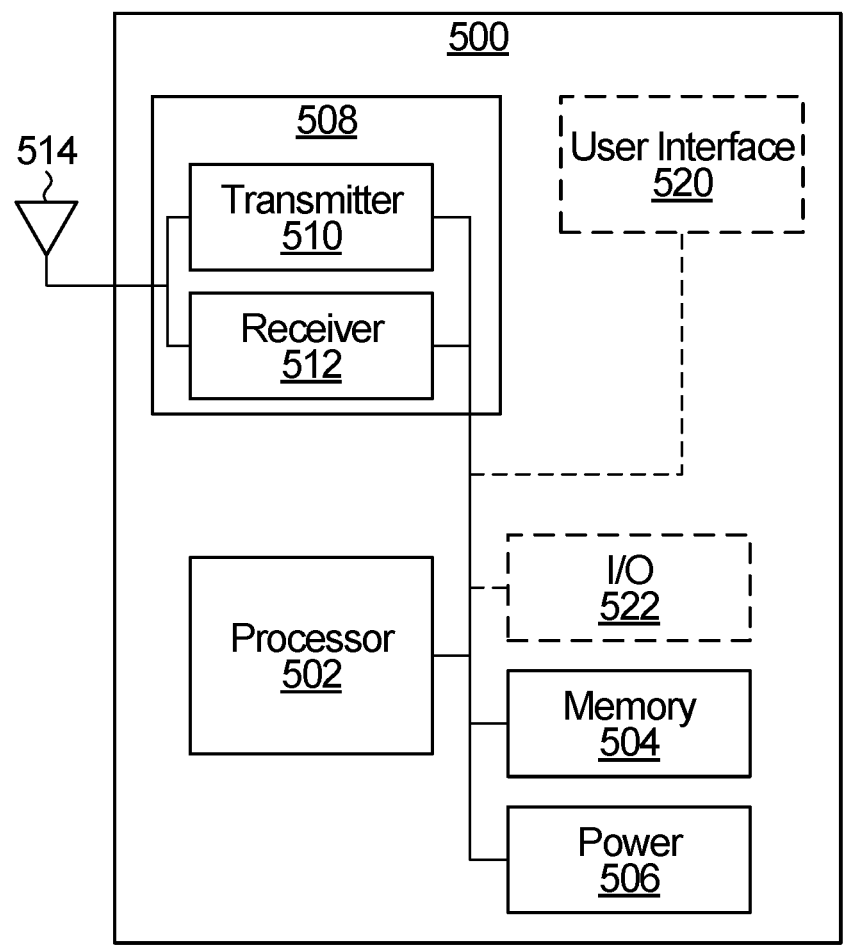
FIG. 13 is a block diagram of a UE according to an embodiment of the present disclosure.

FIG. 13 shows one embodiment of a UE 500 for implementing the methods and modules described herein. The UE 500 may include a processor 502, a memory 504, a power source 506 and a wireless communications interface 508 for sending and receiving data in the communications network 100 shown in FIG. 1, which components may or may not be arranged as shown in FIG. 13. The wireless communications interface 508 includes a transmitter 510 and a receiver 512 coupled to an antenna 514. It will be appreciated that the functions of the wireless communications interface 508 may be carried out by different transceiver or modem components including multiple transmitter, receiver, digital signal processor (DSP) and antenna components or arrays. In one embodiment, the UE 500 includes a user interface 520 and various inputs/outputs (I/O) 522 such as a display, audio input, audio output, keypads, buttons, microphones or other inputs or outputs. The memory 504 may store programming and/or instructions for the processor 502 including instructions for sending, receiving, processing and supporting different services and types of data, such as but not limited to video, VoIP calls, web browsing data, email and other text communications.

Although a single antenna 514 is shown in FIG. 13, a UE could include multiple antennas. Separate receive and transmit antennas or sets of multiple antennas could be provided at 514, or the same antenna or set of multiple antennas could be used for both receiving and transmitting communication signals. The antenna 514 could include one or more antennas of any of various types. The type of the antenna, or each antenna, provided at 514 could be implementation-specific.

The transmitter 510 could perform such operations as frequency up-conversion and modulation, and the receiver 512 could perform inverse operations, including frequency down-conversion and demodulation. The transmitter 510 and the receiver 512 could perform other operations instead of or in addition to these example operations, depending on the specific implementation and the types of communication functions and protocols to be supported. The transmitter 510 and the receiver 512 are operative to transmit communication signals to and receive communication signals from one or more network elements a communication network.

Figure 14:
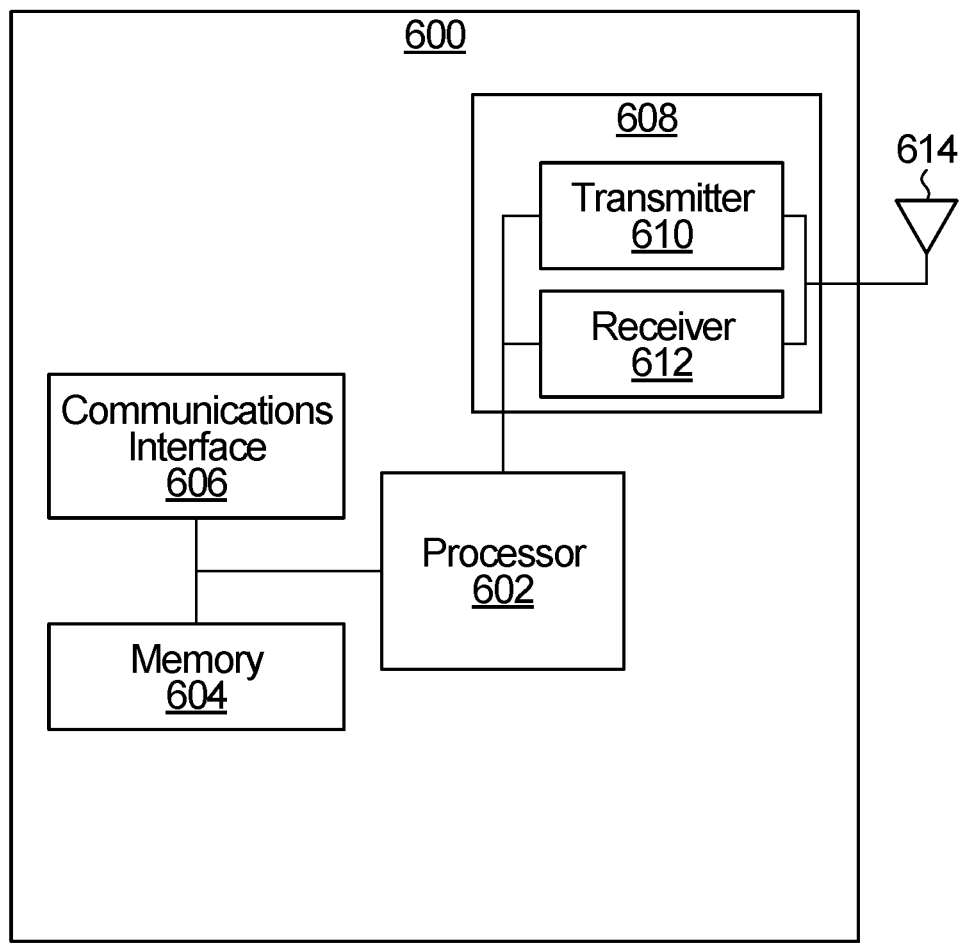
FIG. 14 is a block diagram of a base station in accordance with an embodiment of the present disclosure.

FIG. 14 illustrates a base station 600 according to an embodiment of the present application. The base station 600 may comprise a processor 602, a memory 604, one or more communications interfaces 606, 608. The communications interface 606 may be a wired or wireless interface for sending and receiving data to a backhaul network or to other network nodes, gateways or relays in a network, such as the network 100 shown in FIG. 1. The wireless communications interface 608 is configured to send and receive data with one or more UEs, including transmitting PDCCH and PDSCH messages as described herein. It will be appreciated that the functions of the wireless communications interface 608 may be carried out by different transceiver or modem components including multiple transmitter, receiver and antenna components or arrays. The memory 604 may store programming and/or instructions for the processor 602, including instructions for sending and receiving data to and from a UE.

Although a single antenna 614 is shown in FIG. 14, a base station could include multiple antennas. Separate receive and transmit antennas or sets of multiple antennas could be provided at 614, or the same antenna or set of multiple antennas could be used for both receiving and transmitting communication signals. The antenna 614 could include one or more antennas of any of various types. The type of the antenna, or each antenna, provided at 614 could be implementation-specific.

Figure 15:
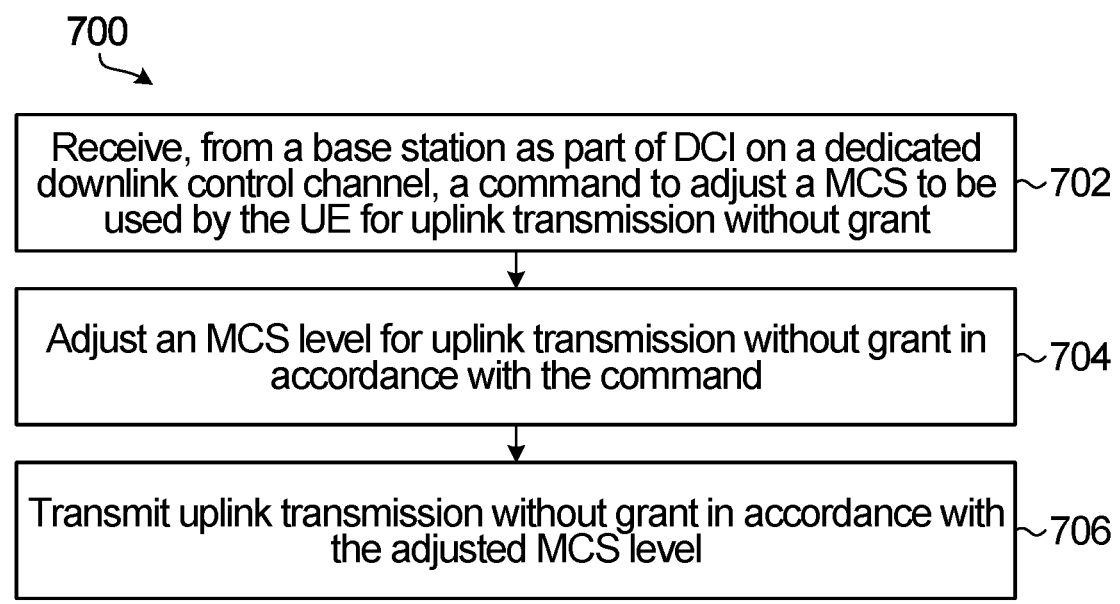
FIG. 15 is a flow diagram of example operations in a UE according to an embodiment of the present disclosure.

FIG. 15 illustrates a flow diagram of example operations 700 in a UE to support uplink transmission without grant in a wireless network according to example embodiments described herein.

In block 702, the UE receives, from a base station, a command as part of DCI on a dedicated downlink control channel. For example, in one embodiment, the UE receives the MCS command in a UE-specific DCI. In another embodiment, the UE receives the MCS command in a group DCI.

In block 704, the UE adjusts an MCS level for uplink transmission without grant in accordance with the command.

In block 706, the UE transmits an uplink transmission without grant in accordance with the adjusted MCS level.

The example operations 700 are illustrative of an example embodiment. Various ways to perform the illustrated operations, as well as examples of other operations that may be performed, are described herein. Further variations may be or become apparent.

Figure 16:
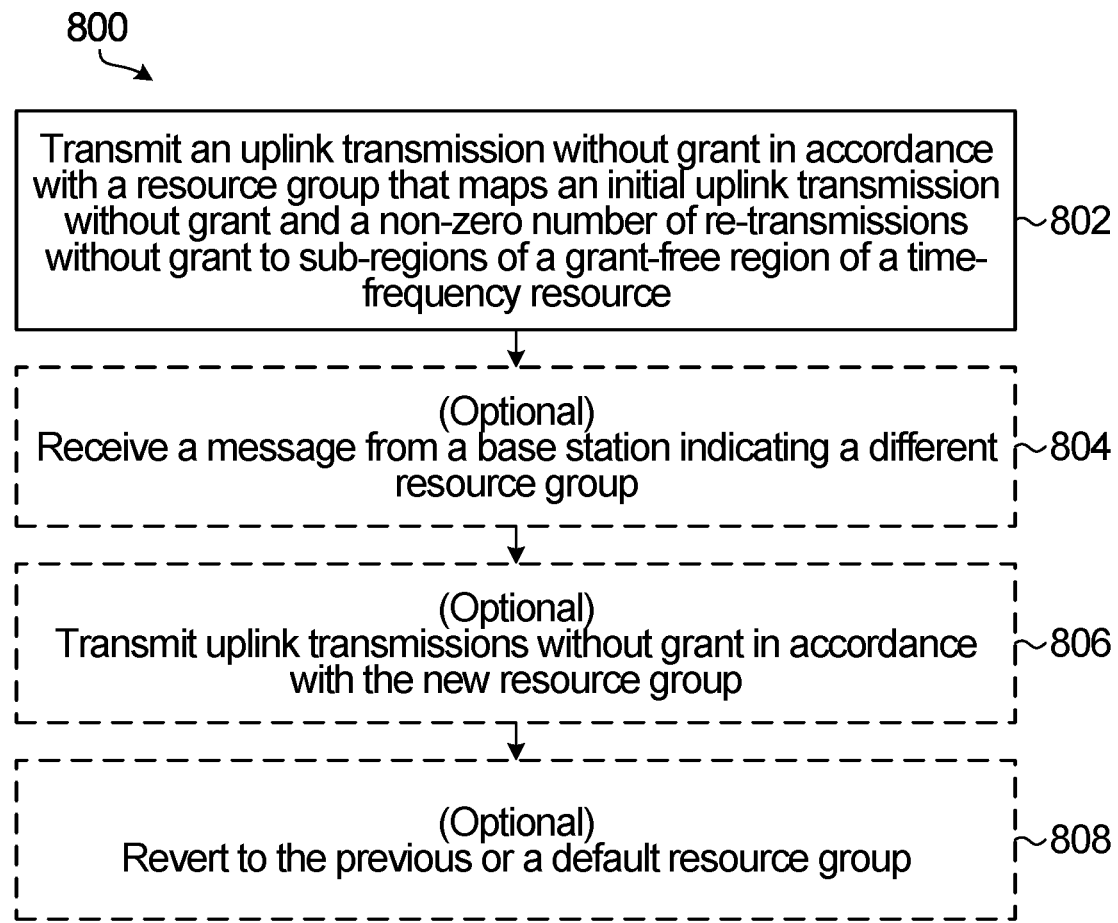
FIG. 16 is a flow diagram of example operations in a UE according to another embodiment of the present disclosure.

FIG. 16 illustrates a flow diagram of example operations 800 in a UE to support uplink transmission without grant in a wireless network according to example embodiments described herein.

In block 802, the UE transmits an uplink transmission without grant in accordance with a resource group having a configuration that maps an initial uplink transmission without grant and a non-zero number of re-transmissions without grant to sub-regions of a grant-free region of a time-frequency resource. For example, in some embodiments, the configuration of the resource group is such that a MCS level for each re-transmission without grant is a same or lower than a MCS level for a corresponding preceding uplink transmission without grant or re-transmission without grant by the UE.

Optionally, in block 804, the UE receives a message from a base station indicating a different resource group.

Optionally, in block 806, the UE transmits uplink transmissions without grant in accordance with the new resource group.

Optionally, in block 808, the UE reverts to the previous or a default pre-configured resource group. For example, the UE may continue to use the revised resource group for uplink transmission without grant of other TBs for a given interval then fall back to a default group. The interval may be indicated in the signaling that provides the revision of the resource group configuration or it may be a pre-configured parameter. In some embodiments, a UE may also or instead fall back to a default resource group configuration after a base station indicates successful decoding of a TB, the maximum number of retransmissions/repetitions has been exhausted, or corresponding packets have been dropped for expiry.

The example operations 800 are illustrative of an example embodiment. Various ways to perform the illustrated operations, as well as examples of other operations that may be performed, are described herein. Further variations may be or become apparent.

Figure 17:
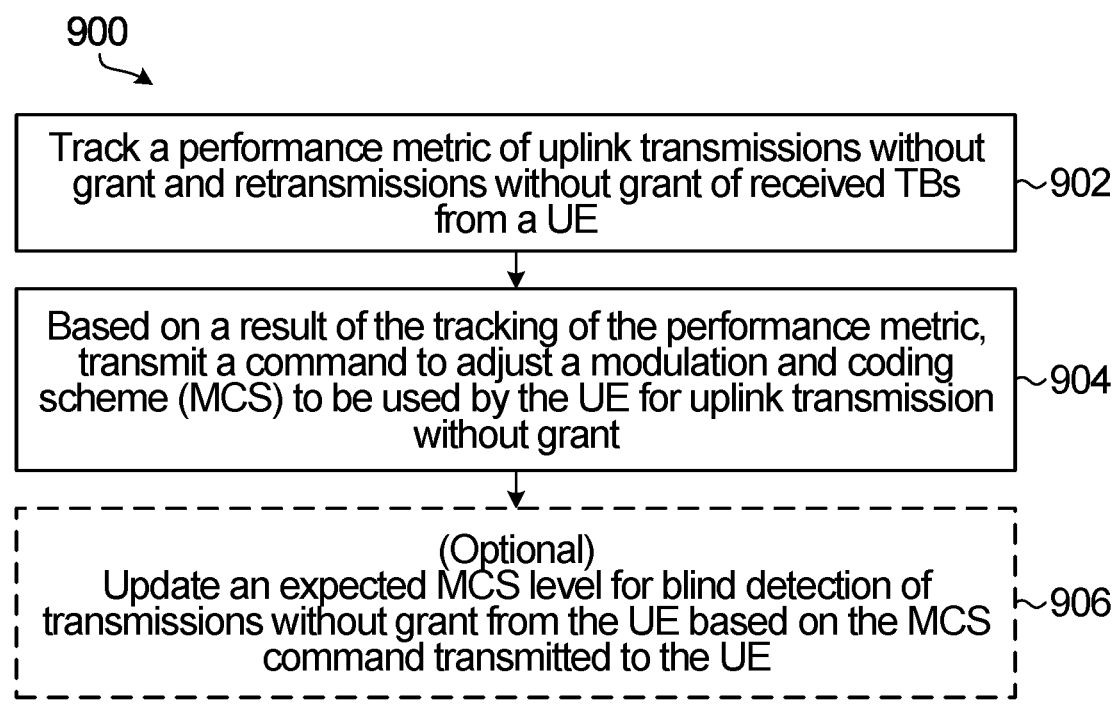
FIG. 17 is a flow diagram of examples operations in a base station in accordance with an embodiment of the present disclosure.

FIG. 17 illustrates a flow diagram of example operations 900 in a base station to support uplink transmission without grant in a wireless network according to example embodiments described herein.

In block 902, the base station tracks a performance metric of uplink transmissions without grant and retransmissions of received TBs from a UE. In some embodiments, the performance metric is an average residual BLER, for example.

In block 904, based on a result of the tracking of the performance metric, the base station transmits a command to adjust the MCS used by the UE for uplink transmission without grant.

Optionally, in block 906, the base station updates an expected MCS level for blind detection of transmissions without grant from the UE based on the command transmitted to the UE.

The example operations 900 are illustrative of an example embodiment. Various ways to perform the illustrated operations, as well as examples of other operations that may be performed, are described herein. Further variations may be or become apparent.

Figure 18:
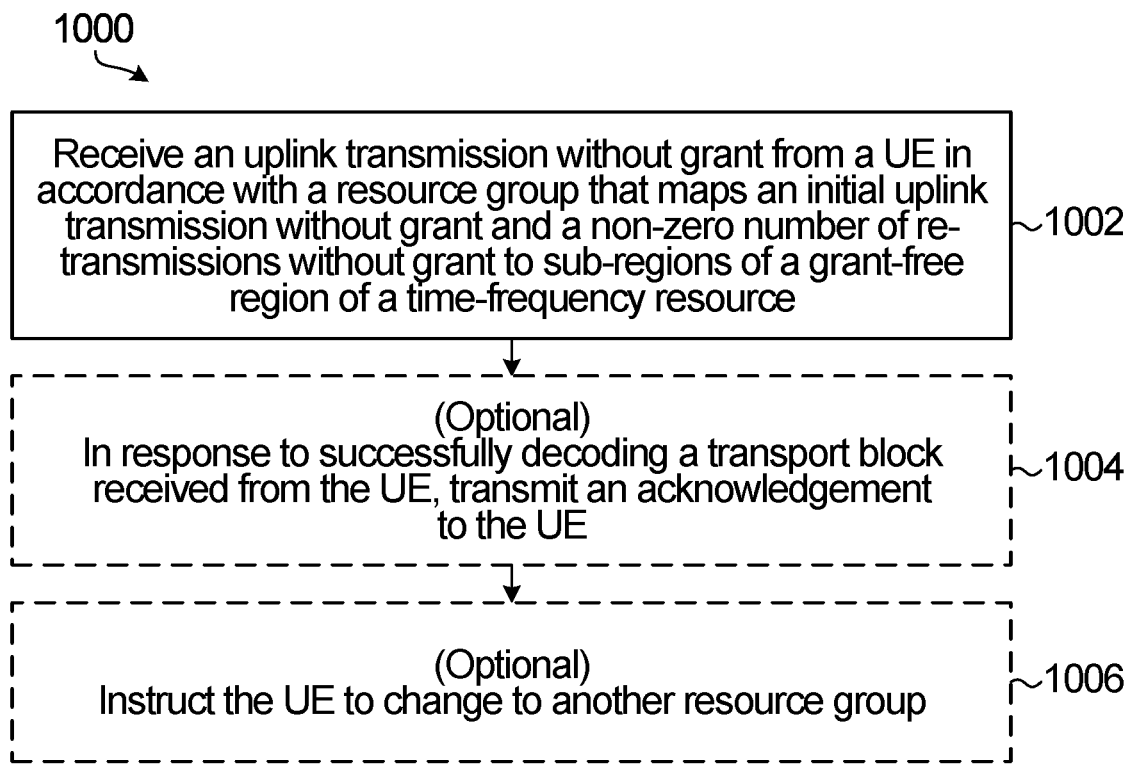
FIG. 18 is a flow diagram of examples operations in a base station in accordance with an embodiment of the present disclosure.

FIG. 18 illustrates a flow diagram of example operations 1000 in a base station to support uplink transmission without grant in a wireless network according to example embodiments described herein.

In block 1002, the base station receives an uplink transmission without grant from a UE in accordance with a resource group that maps an initial uplink transmission without grant and a non-zero number of re-transmissions without grant to sub-regions of a grant-free region of a time-frequency resource. For example, in some embodiments the resource group is configured such that a MCS level for each re-transmission without grant is a same or lower that a MCS level for a corresponding preceding uplink transmission without grant or re-transmission without grant by the UE.

Optionally, in block 1004, in response to successfully decoding a transport block received from the UE, the base station transmits an acknowledgement to the UE.

Optionally, in block 1006, the base station instructs the UE to change to another resource group. For example, the base station may send such an instruction in response to detecting TB size in a new uplink transmission without grant that is larger or smaller than a default TB size.

The example operations 1000 are illustrative of an example embodiment. Various ways to perform the illustrated operations, as well as examples of other operations that may be performed, are described herein. Further variations may be or become apparent.

The following provides a non-limiting list of additional example embodiments of the present disclosure:

Example Embodiment 1

A method for a base station in a wireless network, the method comprising:

a base station receiving an uplink transmission without grant from a user equipment (UE); and based at least in part on the received uplink transmission without grant, the base station transmitting a command to adjust a modulation and coding scheme (MCS) to be used by the UE for uplink transmission without grant.

Example Embodiment 2

The method of Example Embodiment 1, wherein the command is transmitted through layer 1 signaling.

Example Embodiment 3

The method of Example Embodiment 1, wherein the command indicates an adjustment in terms of an MCS level index, each MCS level index being mapped to a respective MCS level.

Example Embodiment 4

The method of Example Embodiment 2, wherein transmitting the command comprises transmitting the command as part of downlink control information (DCI) using a dedicated downlink control channel.

Example Embodiment 5

The method of Example Embodiment 4, wherein transmitting the command as part of DCI comprises periodically transmitting the command over a dedicated UE-specific DCI.

Example Embodiment 6

The method of Example Embodiment 4, wherein transmitting the command as part of DCI comprises periodically transmitting the command over a group DCI.

Example Embodiment 7

The method of Example Embodiment 4, wherein transmitting the command comprises transmitting the command together with a dynamic closed loop uplink transmit power control command as part of the DCI for the UE.

Example Embodiment 8

The method of Example Embodiment 2, wherein transmitting the command comprises: transmitting the command over a downlink acknowledgement channel that also carries Hybrid-Automatic-Repeat-reQuest (HARQ) acknowledgements (ACKs/NACKs) for uplink data transmissions.

Example Embodiment 9

The method of Example Embodiment 1, further comprising determining the command based on tracking a performance metric over uplink transmissions without grant and retransmissions of received transport blocks (TBs) from the UE.

Example Embodiment 10

The method of Example Embodiment 9, wherein the performance metric comprises an average residual block error rate (BLER).

Example Embodiment 11

A method for a user equipment (UE) in a wireless network, the method comprising:

a UE receiving, from a base station, a command to adjust a modulation and coding scheme (MCS) to be used by the UE for uplink transmission without grant, the command being received through layer 1 signaling;

the UE adjusting an MCS level for uplink transmission without grant in accordance with the command; and the UE transmitting an uplink transmission without grant in accordance with the adjusted MCS level.

Example Embodiment 12

The method of Example Embodiment 11, wherein the command indicates an adjustment in terms of an MCS level index, each MCS level index being mapped to a respective MCS level.

Example Embodiment 13

The method of Example Embodiment 13, wherein receiving the command comprises receiving the command as part of downlink control information (DCI) on a dedicated downlink control channel.

Example Embodiment 14

The method of Example Embodiment 13, wherein receiving the command as part of DCI comprises receiving the command over a dedicated UE-specific DCI.

Example Embodiment 15

The method of Example Embodiment 13, wherein receiving the command as part of DCI comprises receiving the command over a dedicated group DCI.

Example Embodiment 16

The method of Example Embodiment 13, further comprising receiving the command together with a dynamic closed loop uplink transmit power control command as part of the DCI.

Example Embodiment 17

The method of Example Embodiment 11, wherein receiving the command comprises receiving the command over a downlink acknowledgement channel that also carries Hybrid-Automatic-Repeat-reQuest (HARQ) acknowledgements (ACKs/NACKs) for uplink data transmissions.

Example Embodiment 18

The method of Example Embodiment 17, wherein receiving the command over a downlink acknowledgement channel comprises receiving the command as part of a dynamic closed loop link adaptation (DCLLA) group on a Physical Hybrid-Automatic-Repeat-reQuest (HARQ) Indicator Channel (PHICH) that carries HARQ acknowledgments encoded and mapped to PHICH groups, wherein DCLLA groups and PHICH groups are frequency multiplexed in the PHICH.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in FIGS. 2 to 15 are also intended solely for illustrative purposes.

Other implementation details could also vary between different embodiments. For example, some of the examples above refer to LTE terminology. However, the embodiments disclosed herein are not in any way limited to LTE systems.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method for a base station in a wireless network, the method comprising:
   the base station receiving an uplink transmission without grant from a UE in accordance with a resource group that maps an initial uplink transmission without grant and a non-zero number of grant-free repetitions to sub-regions of a grant-free region of a time-frequency resource, the base station receiving the initial uplink transmission without grant and one of the non-zero number of grant-free repetitions over two consecutive time slots, a modulation and coding scheme (MCS) level for at least one of the non-zero number of grant-free repetitions being lower than a MCS level for the initial uplink transmission without grant, wherein the at least one of the non-zero number of grant-free repetitions occupies a larger amount of time-frequency resources than the initial uplink transmission without grant, wherein the larger amount of time-frequency resources are selected from a group consisting of time resources, frequency resources, or a combination of both.

2. The method of claim 1 wherein the MCS level for the at least one of the non-zero number of grant-free repetitions and the MCS level for the initial uplink transmission without grant are pre-configured.

3. The method of claim 1 further comprising sending, by the base station, a resource configuration message to the UE to configure sub-regions and numerology for the initial uplink transmission without grant, and sub-regions and numerology for each grant-free repetition.

4. The method of claim 3 wherein the resource configuration message comprises an indication of the non-zero number of grant-free repetitions.

5. The method of claim 1 wherein the resource group is configured based upon target signal quality or reliability level of a received transmission without grant.

6. The method of claim 1, further comprising transmitting, through a higher layer signaling, a configuration message to instruct the UE to use the resource group for uplink transmission without grant.

7. The method of claim 1, wherein each one of the sub-regions is associated with a different numerology.

8. The method of claim 1, wherein the at least one of the non-zero number of grant-free repetitions include a plurality of grant-free repetitions that occupy a gradually increasing amount of frequency resources.

9. The method of claim 1, wherein:
the resource group is among a plurality of pre-configured resource groups, each pre-configured resource group in the plurality being associated with a group index,
the base station instructs the UE to change to another pre-configured resource group by transmitting a message to the UE indicating the group index associated with the other pre-configured resource group.

10. The method of claim 9, wherein the message indicating the group index associated with the other pre-configured resource group is transmitted through higher layer Radio Resource Control (RRC) signaling.

11. The method of claim 9, wherein the message indicating the group index associated with the other pre-configured resource group is transmitted within a UE-specific downlink control information (DCI) message or on a group common DCI.

12. The method of claim 8, further comprising:
in response to successfully decoding a transport block received from the UE, the base station transmitting an acknowledgement or DCI signaling to the UE.

13. A method for a user equipment (UE) in a wireless network, the method comprising:
the UE transmitting an uplink transmission without grant in accordance with a resource group having a configuration that maps an initial uplink transmission without grant and a non-zero number of grant-free repetitions to sub-regions of a grant-free region of a time-frequency resource, the UE transmitting the initial uplink transmission without grant and one of the non-zero number of grant-free repetitions over two consecutive time slots, a modulation and coding scheme (MCS) level for at least one of the non-zero number of grant-free repetitions being lower than a MCS level for the initial uplink transmission without grant, wherein the at least one of the non-zero number of grant-free repetitions occupies a larger amount of time-frequency resources than the initial uplink transmission without grant, wherein the larger amount of time-frequency resources are selected from a group consisting of time resources, frequency resources, or a combination of both.

14. The method of claim 13 wherein the MCS level for the at least one of the non-zero number of grant-free repetitions and the MCS level for the initial uplink transmission without grant are pre-configured.

15. The method of claim 13 further comprising receiving, by the UE, a resource configuration message to configure sub-regions and numerology for the initial uplink transmission without grant, and sub-regions and numerology for each grant-free repetition.

16. The method of claim 15 wherein the resource configuration message comprises an indication of the non-zero number of grant-free repetitions.

17. The method of claim 13 wherein the configuration of the resource group is based upon target signal quality or reliability level of a transmission without grant received by a base station.

18. The method of claim 13, further comprising receiving, through a higher layer signaling, a configuration message instructing the UE to use the resource group for uplink transmission without grant.

19. The method of claim 13, wherein each one of the sub-regions is associated with a different numerology.

20. The method of claim 13, wherein the at least one of the non-zero number of grant-free repetitions include a plurality of grant-free repetitions that occupy a gradually increasing amount of frequency resources.

21. The method of claim 13, wherein:
the resource group is among a plurality of pre-configured resource groups, each pre-configured resource group in the plurality being associated with a group index, and
the UE changes to another pre-configured resource group responsive to receiving a message indicating the group index associated with the other pre-configured resource group.

22. The method of claim 21, wherein the message indicating the group index associated with the other pre-configured resource group is received through higher layer Radio Resource Control (RRC) signaling.

23. The method of claim 21, wherein the message indicating the group index associated with the other pre-configured resource group is received within a UE-specific downlink control information (DCI) message or on a group common DCI.

24. The method of claim 20, further comprising terminating grant-free repetitions in response to any of the following:
the UE receiving an acknowledgement or DCI from a base station indicating a transport block transmitted by the UE has been successfully decoded; and
the non-zero number of grant-free repetitions reaching the maximum number.

25. A base station comprising:
a wireless communications interface;
a memory storage comprising instructions; and
one or more processors in communication with the memory storage and the wireless communications interface, wherein the one or more processors execute the instructions to:
receive an uplink transmission without grant from a UE in accordance with a resource group that maps an initial uplink transmission without grant and a non-zero number of grant-free repetitions to sub-regions of a grant-free region of a time-frequency resource, the base station receiving the initial uplink transmission without grant and one of the non-zero number of grant-free repetitions over two consecutive time slots, a modulation and coding scheme (MCS) level for at least one of the non-zero number of grant-free repetitions being lower than a MCS level for the initial uplink transmission without grant, wherein the at least one of the non-zero number of grant-free repetitions occupies a larger amount of time-frequency resources than the initial uplink transmission without grant, wherein the larger amount of time-frequency resources are selected from a group consisting of time resources, frequency resources, or a combination of both.

26. The base station of claim 25 wherein the MCS level for the at least one of the non-zero number of grant-free repetitions and the MCS level for the initial uplink transmission without grant are pre-configured.

27. The base station of claim 25 wherein the one or more processors execute the instructions to send a resource configuration message to the UE to configure sub-regions and numerology for the initial uplink transmission without grant, and sub-regions and numerology for each grant-free repetition.

28. The base station of claim 25 wherein the one or more processors execute the instructions to transmit, through a higher layer signaling, a configuration message to instruct the UE to use the resource group for uplink transmission without grant.

29. A user equipment (UE) comprising:
- a wireless communications interface;
- a memory storage comprising instructions; and
- one or more processors in communication with the memory storage and the wireless communications interface, wherein the one or more processors execute the instructions to:
  transmit an uplink transmission without grant in accordance with a resource group that maps an initial uplink transmission without grant and a non-zero number of grant-free repetitions to sub-regions of a grant-free region of a time-frequency resource, the UE transmitting the initial uplink transmission without grant and one of the non-zero number of grant-free repetitions over two consecutive time slots, a modulation and coding scheme (MCS) level for at least one of the non-zero number of grant-free repetitions being lower than a MCS level for the initial uplink transmission without grant, wherein the at least one of the non-zero number of grant-free repetitions occupies a larger amount of time-frequency resources than the initial uplink transmission without grant, wherein the larger amount of time-frequency resources are selected from a group consisting of time resources, frequency resources, or a combination of both.

30. The UE of claim 29 wherein the MCS level for the at least one of the non-zero number of grant-free repetitions and the MCS level for the initial uplink transmission without grant are pre-configured.

31. The UE of claim 29 wherein the one or more processors execute the instructions to receive a resource configuration message to configure sub-regions and numerology for the initial uplink transmission without grant, and sub-regions and numerology for each grant-free repetition.

32. The UE of claim 29, wherein the one or more processors execute the instructions to receive, through a higher layer signaling, a configuration message instructing the UE to use the resource group for uplink transmission without grant.

* * * * *